United States Patent
Tomita et al.

(10) Patent No.: US 6,297,931 B2
(45) Date of Patent: *Oct. 2, 2001

(54) RECORDING DISK WITH ROUND SPINDLE HOLE IN MAGNETIC HUB AND PRERECORDED TRACKING SERVO INFORMATION

(75) Inventors: Yasushi Tomita, Kanagawa; Mamoru Oosato, Tokyo; Hiroyuki Suzuki, Kanagawa, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/132,252

(22) Filed: Aug. 11, 1998

(30) Foreign Application Priority Data

Aug. 15, 1997 (JP) ..................................................... 9-220504

(51) Int. Cl.[7] ..................................................... G11B 23/03
(52) U.S. Cl. ..................... 360/133; 360/99.05; 369/270
(58) Field of Search .......................... 360/98.08, 99.05, 360/99.12, 133; 369/270, 271, 282, 289, 290

(56) References Cited

U.S. PATENT DOCUMENTS

| 4,224,648 | * | 9/1980 | Roling .............................. 360/99.12 |
| 4,358,803 | * | 11/1982 | Van Der Giessen .............. 360/99.12 |
| 5,103,363 | * | 4/1992 | Yamada et al. ....................... 360/133 |
| 5,383,078 | * | 1/1995 | Kato et al. ........................... 360/133 |
| 5,903,404 | * | 5/1999 | Tsurumi et al. ....................... 360/48 |
| 6,061,215 | * | 5/2000 | Tomita ................................. 360/133 |

* cited by examiner

Primary Examiner—David L. Ometz
(74) Attorney, Agent, or Firm—Jay H. Maioli

(57) ABSTRACT

A disc includes a disc substrate having a major surface operating as a signal recording portion and having a substantially circular center opening in the major surface, and a hub mounted on the disc substrate for closing the center opening in the disc substrate. The hub includes an inner rim portion having a spindle opening at its center and an outer rim portion connected to an outer side of the inner rim portion for extending from the inner rim portion via a step difference towards the side of insertion in the spindle opening. When the hub is set on a disc table, the outer rim portion protruded on the side from which the spindle is inserted into the spindle opening with a step difference approaches a magnet provided on the disc table to increase the force of suction by the magnet so that the magnetic disc is chucked with respect to the disc table solely by the force of the magnet.

8 Claims, 18 Drawing Sheets

RECORDING DISK WITH ROUND SPINDLE HOLE IN MAGNETIC HUB AND PRERECORDED TRACKING SERVO INFORMATION

BACKGROUND OF THE INVENTION

1. Field of the Invention

This invention relates to a signal recording medium and a disc cartridge holding this signal recording medium.

2. Description of Related Art

Up to now, a signal recording medium, having the major surface of a flexible disc substrate as a signal recording surface and adapted for recording information signals on this signal recording surface, such as a magnetic disc, has been in use.

As a magnetic disc employing a flexible disc substrate, such a disc having the diameter of 3.5 inch is in use. This magnetic disc has a center hub for chucking the magnetic disc to a disc drive device. The magnetic disc, used so extensively, has a recording capacity of 2 megabyte (MB).

The magnetic disc 200, now in wide use, has a disc substrate 201 of a flexible synthetic resin material, with the major surface of the disc substrate being used as a signal recording surface, as shown in FIGS. 1 and 2. The disc substrate 201 has a circular center opening 201a which is closed by a hub 202.

This hub 202 is formed of a magnetic material, such as iron, and has a tubular projection 202a fitted in the center opening 201a, and is mounted on the disc substrate 201 by having a flange 202b on the outer rim side of the projection 202a bonded to the rim of the center opening 201a, as shown in FIG. 2. At the center of the hub 202 is formed a rectangular spindle opening 202b passed through by a spindle 221 of a rotation driving unit 220 provided on the disc drive device as shown in FIG. 3. At a position of the hub 202 offset from a driving pin 223 on the disc drive device is bored a rectangular driving pin engagement opening 202c engaged by a driving pin 223 on the disc drive device. That is, the driving pin engagement opening 202c is formed at a pre-set distance from the spindle opening 202b.

The spindle opening 202b, provided in the hub 202, substantially has the shape of a square each side being sized to be slightly larger than the diameter of the spindle passed therein. This spindle opening 202b has its center C1—C1 offset towards the driving pin engagement opening 202c with respect to the center O2—O2 of the hub 202, as shown in FIG. 2. The spindle opening 202b is formed in the course of drawing the magnetic material of the hub 202 and has an upstanding wall section 202f on each side, as shown in FIG. 2. These upstanding wall sections 202f support the peripheral surface of the spindle 221 passed through the spindle opening 202b and functions to permit the spindle 221 to pass through the spindle opening 202b. The corners of the substantially square-shaped spindle opening 202b are arcuately formed, as shown in FIG. 1.

The hub 202, mounted on the disc substrate 201, has the distal end face of the projection 202a, in which are formed the spindle opening 202b and the driving pin engagement opening 202c, as a setting surface 202e for a disc supporting surface 222a of a disc table 222 of the disc rotation unit 220. The outer rim side of the setting surface 202e is used as a suction portion by a magnet 224 arranged on the outer rim side of the disc supporting surface 222a.

The magnetic disc 200, arranged as described above, is rotated in unison with the disc table 222 of the disc rotation unit 220 provided on the disc drive device side, as the hub 202 is checked and centered with respect to the disc table 222. The information signals are recorded or reproduced for the magnetic disc 200 by the magnetic disc 200 being operated by a magnetic head.

The disc rotation unit 220, provided on the disc drive device, on which is loaded the magnetic disc 200, has the disc table 222 integrally mounted on the distal end of the spindle 221 run in rotation by a spindle motor, not shown, as shown in FIG. 3. The upper surface of the disc table 222 mounted on the distal end of the spindle 221 is a disc supporting surface 222a on which is set the hub 202 of the magnetic disc 200. On the disc table 222 is mounted a driving pin 223 at a position offset from the spindle 221. The driving pin 223 is mounted for movement in a direction emerging from or receding into the disc supporting surface 222a and in a direction towards and away from the disc supporting surface 222a. The driving pin 223 is biased by biasing means, not shown, in a direction away from the spindle 221.

On the disc supporting surface 222a of the disc table 222 is arranged a ring-shaped magnet 224, such as a rubber magnet, arranged for surrounding the disc supporting surface 222a. The magnet 224 is mounted on the disc table 222 so that the magnet is lower in level than the disc supporting surface 222a on which is set the hub 202 of the magnetic disc 200 so that a pre-set distance H0 is maintained between the magnet surface and the setting surface 202e of the hub 202 set on the disc supporting surface 222a.

The magnetic disc 200 is chucked on the disc table 222 by having the spindle 221 passed through the spindle opening 202b, engaging the driving pin 223 in the driving pin engagement opening 202c, setting the setting surface 202e on the disc supporting surface 222a of the disc table 222, as shown in FIG. 4 and by having the hub 202 attracted by the magnet 224.

The state in which the magnetic disc 200 is loaded on the disc table 222 is hereinafter explained.

In an initial state in which the magnetic disc 200 is set on the disc table 222 and the spindle 221 is passed through the spindle opening 202b with the driving pin 223 engaging in the driving pin engagement opening 202c, the spindle 221 and the driving pin 223 are usually inserted into or engaged with the spindle opening 202b and the driving pin engagement opening 202c without being thrust from the inner peripheral surface of the spindle opening 202b or the driving pin engagement opening 202c. At this time, the center-to-center distance F between the spindle 221 and the driving pin 223 is an initial state distance for which the driving pin 223 is not moved towards the outer rim of the magnetic disc 200.

The spindle opening 202b is formed as a square-shaped opening having the length of each side equal to L and having arcuately rounded corners, as shown in FIG. 5. The spindle 221, inserted into the spindle opening 202b, is formed as a column having a diameter $\phi E$ shorter than the length D of one each side of the spindle opening 202b. The driving pin engagement opening 202c is formed as a rectangle having a length of a long side and a length of a short side equal to A and B, respectively, and arcuately rounded corners, as shown in FIG. 5. The driving pin 223, engaged in this driving pin engagement opening 202c, is formed as a column having a diameter $\phi C$ shorter than the length B of the short side of the driving pin engagement opening 202c.

If the disc table 222 is run in rotation in the direction indicated by arrow R in FIG. 5, from an initial state in which magnetic disc 200 is set on the disc table 222, with the spindle 221 passed through the spindle opening 202b and with the driving pin 223 engaged in the driving pin engagement opening 202c, as shown in FIG. 5, the driving pin 223 compresses against an outer corner of the driving pin engagement opening 202c disposed in the rotating direction of the disc table 222, as shown in FIG. 6, to shift the magnetic disc 200 towards the outer rim of the spindle 221. By the magnetic disc 200 being moved towards the outer rim of the spindle 221 by the driving pin 223, the spindle 221 is abutted on the corner of the driving pin engagement opening 202c of the spindle opening 202b remote from the corner of the driving pin engagement opening 202c on which is abutted the driving pin 223, as shown in FIG. 6, thus centering the hub 202 of the magnetic disc 200 with respect to the disc table 222.

When the hub 202 of the magnetic disc 200 is centered with respect to the disc table 222, there is produced a differential rotational velocity between the disc table 222 and the magnetic disc 200. That is, the driving pin 223 is rotated in advance of the magnetic disc 200 so that the driving pin 223 is abutted against the outer corner of the driving pin engagement opening 202c disposed along the rotational direction of the disc table 222. By the driving pin 223 compressing against the driving pin engagement opening 202c, the magnetic disc 200 is moved from the center towards the outer rim of the spindle 221 to center the hub 202 with respect to the disc table 222. At this time, the driving pin 223 is moved towards the inner rim of the hub 202 so that the center-to-center distance G between the spindle 221 and the driving pin 223 becomes smaller than the initial distance F shown in FIG. 5.

By the magnetic disc 200 being attracted to the disc table 222 by the magnet 224, the magnetic disc 200 is rotated in unison with the disc table 222 in the centered state. By the magnetic head scanning the signal recording area of the magnetic disc 200 in this state, the information signals can be recorded or reproduced for the magnetic disc 200.

The magnetic disc 200, arranged as described above, is housed in a main cartridge body portion 213 to form a disc cartridge 210, as shown in FIGS. 7 and 8. The magnetic disc 200 is loaded on the disc drive device as the magnetic disc is held in the main cartridge body portion 213 and chucked on the disc table 222 of the disc rotation unit 220.

The disc cartridge 210, holding the magnetic disc 200, is provided with the main cartridge body portion 213, produced by abutting and interconnecting an upper cartridge half and a lower cartridge half, and the magnetic disc 200 is rotatably housed within this main cartridge body portion 213. At a mid portion on the lower surface of the main cartridge body portion 213 is formed a spindle opening 215 into which is inserted the spindle 211, as shown in FIG. 8. In the facing upper and lower surfaces of the main cartridge body portion 213 are formed rectangular recording and/or reproducing apertures 221, 222. These apertures 221, 222 are disposed at a mid position in the left-and-right direction of the main cartridge body portion 213, and are formed from the vicinity of the spindle opening 215 towards the front side of the main cartridge body portion 213. The magnetic disc 200 accommodated in the main cartridge body portion 213 has its signal recording area partially exposed via the apertures 221, 222 across the inner and outer rims of the disc. There is also provided in the main cartridge body portion 213 a mistaken recording inhibiting hole 231 operating as a discriminating hole indicating whether or not the information signals recorded on the magnetic disc 200 held therein can be erased by overwriting or erasure. There is also provided in the lower surface of the main cartridge body portion 213 in register with the mistaken recording inhibiting hole 231 a disc discriminating hole 232 specifying the sort of the magnetic disc held in the main cartridge body portion 213, as shown in FIG. 8. By detecting this disc discriminating hole 232, it can be discriminated that the magnetic disc 200 held in the main cartridge body portion 213 is of the recording capacity of 200 MB. The disc discriminating hole 232 is provided in the disc cartridge 210 holding the magnetic disc 200 with the recording capacity of 2 MB.

On this disc cartridge 210 is mounted a shutter member 214, formed by an metal plate of aluminum or stainless steel or molded from a synthetic resin material, and which is adapted for opening/closing the recording and/or reproducing apertures 221, 222 from the front side of the main cartridge body portion 213 while being movable in a direction of opening/closing the recording and/or reproducing apertures 221, 222. The shutter member 214 has shutter portions 214a, 214b overlying the apertures 221, 222 and having apertures 233, 234 registering with the apertures 221, 222 when the shutter member has moved to a position opening the apertures 221, 222.

The magnetic disc with the diameter of 3.5 inch has a recording capacity of 2 MB. For processing a program software or data of a larger capacity, it is desired to furnish a magnetic disc of a higher recording capacity.

On the other hand, the magnetic disc having the diameter of 3.5 inch is in widespread use as a recording medium for an information processing apparatus such as a computer. Thus, it is desirable that the magnetic disc having the diameter of 3.5 inch shall be usable with interchangeability on a disc drive device having a magnetic disc of a high recording capacity.

The conventional magnetic disc, having the diameter of 3.5 inch, is run in rotation at 300 rpm for recording and/or reproducing information signals, has a drawback that it is low in the data transfer rate.

SUMMARY OF THE INVENTION

It is an object of the present invention to provide a disc-shaped recording medium that can be used with interchangeability with a conventional disc-shaped recording medium on a common disc drive device, that enables constitution of a disc drive device having a high data transfer rate and that can be loaded in a stable state on a disc rotation unit. It is another object of the present invention to provide a disc cartridge holding this disc-shaped recording medium.

In one aspect, the present invention provides a disc-shaped recording medium including a disc substrate having a major surface operating as a signal recording portion and having a substantially circular center opening in the major surface and a hub mounted on the disc substrate for closing the center opening in the disc substrate. The hub includes a circular center spindle opening in which a spindle of a disc drive device is inserted. The hub also includes, at a predetermined distance from the spindle opening, a driving member inserting opening in which is inserted a driving member of the disc drive device.

In another aspect, the present invention provides a disc cartridge including a main cartridge body portion made up of a pair of halves, with an opening being formed in one of the halves for insertion of a spindle of a disc drive device therein, and a disc-shaped recording medium rotatably housed in the main cartridge body portion.

In a further aspect, the present invention provides a disc-shaped recording medium having a disc substrate having a major surface operating as a signal recording portion and a substantially circular center opening in the major surface and a hub mounted on the disc substrate for closing the center opening provided in the disc substrate. The hub includes a circular center spindle opening in which the spindle is inserted. The hub also includes, at a predetermined distance from the spindle opening, a driving member inserting opening in which a driving member of the disc drive device is inserted.

In yet another aspect, the present invention provides a disc cartridge including a main cartridge body portion made up of a pair of halves, with an opening being formed in one of the halves for insertion of a spindle of a disc drive device. On this main cartridge body portion is mounted a hub including an inner rim portion having a spindle opening at its center and an outer rim portion connected to an outer side of the inner rim portion via a step difference for extending from the inner rim portion towards a side from which the spindle is inserted into the spindle opening. The disc-shaped recording medium is rotatably housed in the disc cartridge.

With the disc-shaped recording medium and the disc cartridge holding this disc-shaped recording medium, described above, the hub chucked on the disc table of the disc rotation unit has a circular spindle opening and a driving pin engagement opening, in which is inserted the driving pin, so that the disc cartridge can be interchangeably loaded on the disc drive device on which the conventional disc-shaped recording medium is loaded in centered state.

In particular, since the spindle opening provided in the hub is circular in profile, the hub can be formed to high accuracy. The disc-shaped recording medium can be chucked on the disc table in position in a stable state. The information signals can be recorded and/or reproduced without oscillations in the rotational plane even on high-speed rotation.

Moreover, with the disc-shaped recording medium according to the present invention and the disc cartridge housing this recording medium, since the hub mounted centrally of the disc substrate of the disc-shaped recording medium includes an inner rim portion having the spindle opening at its center and an outer rim portion connected to an outer side of the inner rim portion via a step difference for extending from the inner rim portion towards the side of insertion in the spindle opening. When the disc cartridge is mounted on the disc rotation unit of the disc drive device, the outer rim portion of the hub can be approached to the magnet provided on the disc rotation unit so that the hub can be loaded with a larger force of attraction on the disc rotation unit thus improving attraction to the disc table of the conventional magnetic disc loaded in centered state on the disc table. In addition, the magnetic disc rotated at an elevated speed can be positively unified to the disc table.

DESCRIPTION OF THE PREFERRED EMBODIMENTS

A disc-shaped recording medium and a disc cartridge holding this disc-shaped recording medium, according to the present invention, are hereinafter explained.

In the following description, the present invention is applied to a magnetic disc having a flexible disc substrate.

Before proceeding to description of the magnetic disc according to the present invention, a disc drive device, on which is used the magnetic disc of the present invention, is explained.

The present disc drive device is adapted for enabling recording and/or reproduction of information signals for both the conventional magnetic disc having the recording capacity of 2 MB and the magnetic disc according to the present invention.

Figure 9:
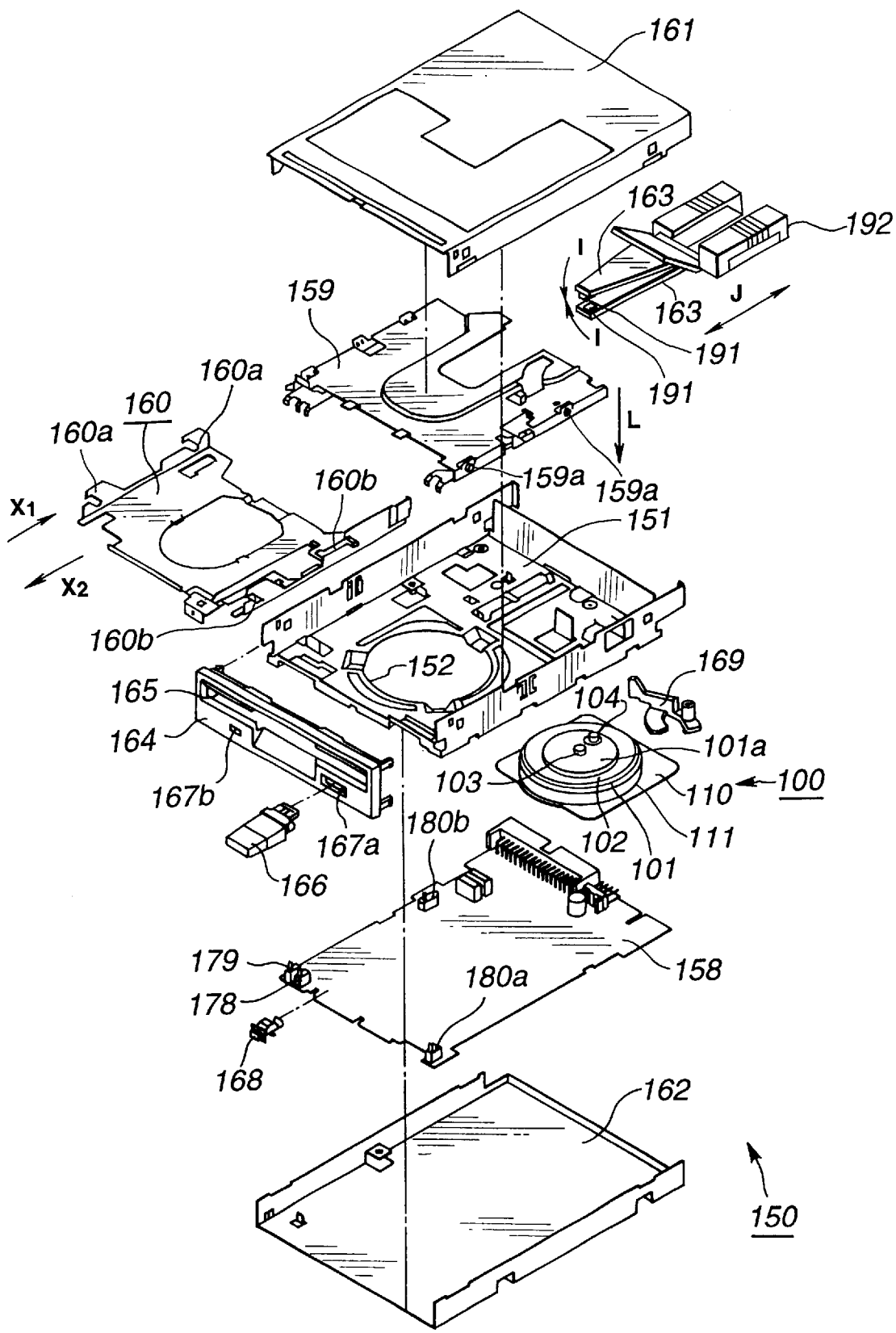
FIG. 9 is an exploded perspective view showing a disc drive device on which are selectively loaded a magnetic disc of the present invention and a conventional magnetic disc.

The present disc drive device 150 has a base 151 substantially in the form of a flat plate and a disc rotation unit 100 at a mid portion of the base 151 for rotationally driving the magnetic disc, as shown in FIG. 9. The disc rotation unit 100 has a spindle motor 111 having a spindle 103 as a driving shaft on the distal end of which is integrally carried a disc table 101. The disc rotation unit 100 is mounted on the base 151 by fitting the spindle motor 111 in a mid opening 152 so that the spindle 103 is projected on the upper side of the base 151, and by securing a stator substrate 110 carrying the spindle motor 111 on the lower surface of the base 151.

The disc table 101, mounted on the distal end of the spindle 103 for rotation in unison with the spindle 103, has, on its upper surface, a disc supporting surface 101a on which to set the hub of the magnetic disc. The disc table 101 carries a driving pin 104 at a position offset from the spindle 103. This driving pin 104 is mounted for movement in a direction emerging from or receded below the disc supporting surface 101a and in a direction approaching to and separated from the disc supporting surface 101a. The driving pin 104 is biased by biasing means, not shown, in a direction away from the spindle 103.

On the disc supporting surface 101a of the disc table 101 is mounted a ring-shaped magnet 102, such as a rubber magnet, arranged for surrounding the disc supporting surface 101a. The magnet 102 is mounted on the disc table 101 so that the magnet is lower in level than the disc supporting surface 101a.

On the lower surface of the base 151 is mounted an electronic circuit board 158 on which are arranged a variety of electronic circuits or detection switches. On the lower surface of the base 151 is mounted a lower cover 162 adapted for covering the lower surface of the electronic circuit board 158.

On the upper surface of the base 151 provided with the disc table 101 is mounted a cartridge holder 159 for holding the disc cartridge and loading the magnetic disc in the disc cartridge on the disc table 101. The cartridge holder 159 holds the disc cartridge inserted from the front side of the disc drive device for moving it to below the base 151 to load the magnetic disc accommodated in the disc cartridge held thereby onto the disc table 101. The cartridge holder 159 is in the form of a thin casing opened on the front and lower side and is dimensioned to hold the disc cartridge inserted from the front side of the disc drive device.

On the upper surface of the base 151 between the base 151 and the cartridge holder 159 is arranged an uplifting/lowering plate 160 for uplifting/lowering the cartridge holder 159 in the direction indicated by arrow L in FIG. 9 and away from the disc rotation unit 110 arranged on the base 151. On these cams 160a, 160b are set supporting pins 159a protuberantly formed on both sides of the cartridge holder 159. The cartridge holder 159 is held at an upper position spaced apart from the disc table 101 by the supporting pins 159a being supported on the upper surfaces of cam plates 160a, 160b when the uplifting/lowering plate 160 has been moved in the direction indicated by arrow X1 in FIG. 9 towards the rear side of the base 151. At this time, the disc cartridge held by the cartridge holder 159 is ejected or a disc cartridge can be inserted into the cartridge holder 159. Also, when the uplifting/lowering plate 160 is moved in the direction indicated by arrow X2 in FIG. 9, towards the front side of the base 151, the supporting pins 159a are moved along the inclined surfaces of the cam plates 160a, 160b to lower the cartridge holder 159 towards the disc table 101 towards the base 151 in the direction indicated by arrow J in FIG. 9 in order to load the disc cartridge held in the cartridge holder 159 on a cartridge loading unit constructed on the base 151 to load the magnetic disc housed in the disc cartridge on the disc table 101.

The uplifting/lowering plate 160 is biased into movement in the direction indicated by arrow X2 in FIG. 9, under the bias of a biasing member, not shown. Towards the back side of the base 151 is provided a lock lever 169 adapted for locking the uplifting/lowering plate 160 at the rearward moved position when the uplifting/lowering plate 160 has been moved rearwards in the direction indicated by arrow X1 in FIG. 9.

On the forward end face of the base 151 is mounted a front side panel 164 having a cartridge insertion/ejection opening 165 used for inserting or ejecting a disc cartridge. On this front side panel 164 are mounted an ejection button opening 167a for projecting an ejection button 166 and a display light opening 167b in which to mount a display light 168. When thrust from the front side of the front side panel 164, the ejection button 166 moves a movement actuation plate 161 in the direction indicated by arrow X1 in FIG. 9 to shift the uplifting/lowering plate 160 in the same direction, that is in the direction indicated by arrow X1 in FIG. 9, to move the uplifting/lowering plate 160 in the same direction as indicated by arrow X1 in FIG. 9 to lock the uplifting/lowering plate 160 to a lock lever 169.

Rearwardly of the disc drive device 150 on the base 151 are arranged a pair of head arms 163, 163 making up a magnetic head device. On the distal ends of the head arms 163, 163 are mounted a pair of magnetic heads 191, 191 facing each other. These head arms 163, 163 are biased by biasing means, not shown, into rotation in the direction indicated by arrows I in FIG. 9, in which the distal ends approach towards each other. That is, the magnetic head 191, 191 are biased in a direction of approaching to each other. The head arms 163, 163 are moved by a voice coil motor 192 in the fore-and-aft direction of the base 151 radially of the magnetic disc mounted on the disc table 101, that is in the direction indicated by arrow J in FIG. 9.

The disc cartridge is inserted via cartridge insertion/ejection opening 165 provided in the front side panel 164 into the interior of the disc drive device 150 so as to be held by the cartridge holder 159. At this time, the shutter mounted on the disc cartridge is moved for opening the recording and/or reproducing apertures provided in the upper and lower surfaces of the disc cartridge. Via these apertures, the magnetic heads 191, 191 mounted on the distal ends of the head arms 163, 163 are intruded into the interior of the main cartridge body portion for clinching the magnetic disc held in the main cartridge body portion between these magnetic head 191, 191.

When the disc cartridge is inserted into the cartridge holder 159, the lock lever 169 is thrust by the disc cartridge to release the locking of the uplifting/lowering plate 160 by the lock lever 169. The uplifting/lowering plate 160, released from lock by the lock lever 169, is moved forwardly of the disc drive device 150, that is in the direction indicated by arrow X2 in FIG. 9, under the biasing by the biasing member. By movement of the uplifting/lowering plate 160 in the direction indicated by arrow X2 in FIG. 9, the cartridge holder 159 descends towards the disc table 101, that is in the direction indicated by arrow J in FIG. 9. When the cartridge holder 159 descends towards the disc table 101, the disc cartridge held by the cartridge holder 159 is supported by a positioning pin, not shown, provided on a cartridge loading unit provided in turn on the base 151, for loading the disc cartridge in position on the cartridge loading unit.

On the electronic circuit board 158, mounted on the lower side o the base 151, are mounted a disc-in detection switch 178 and a write protection detection switch 179 so that operators thereof are protruded on the upper surface of the base 151, as shown in FIG. 9. The disc-in detection switch 178 is used for detecting the possible presence of the disc cartridge, while the write protection detection switch 179 is used for detecting the state of the write protection discrimination hole. The disc-in detection switch 178 is thrust by the disc cartridge when the disc cartridge is loaded on the cartridge loading unit to detect the loading of the disc cartridge on the cartridge loading unit. The write protection detection switch 179 detects the possible presence of the write protection discrimination hole when the disc cartridge is loaded on the cartridge loading unit to discriminate whether or not the information signals can be recorded on the magnetic disc held in the disc cartridge.

On the electronic circuit board 158 are mounted disc capacity detection switches 180a, 180b for detecting the disc capacity discriminating holes formed in the disc cartridge, as shown in FIG. 9. These detection switches 180a, 180b are provided in register with the disc capacity discriminating holes formed in the disc cartridge loaded on the cartridge loading unit and detect the possible presence and the positions of the disc capacity discriminating holes provided in the disc cartridge loaded on the cartridge loading unit to detect the capacity of the magnetic disc housed in the disc cartridge.

When the disc cartridge is loaded on the cartridge loading unit, the magnetic disc housed within the disc cartridge is set on the disc table 101 by the hub being attracted by the magnet 102 provided on the disc table 101. At this time, the spindle 103 is inserted into a spindle opening provided in the hub. The driving pin 104 is engaged in a chuck pin inserting hole 2d after rotation of the disc table 101.

A larger-capacity magnetic disc, as disc-shaped recording medium of the present invention loaded on the above-described disc drive device, and a disc cartridge holding this magnetic disc, are hereinafter explained.

A first embodiment of the large-capacity magnetic disc 1 according to the present invention is explained with reference to FIGS. 10 and 11.

A magnetic disc 1 of the first embodiment of the present invention includes a disc substrate 3, both major surfaces of which are coated with a magnetic medium to form signal recording portions. The disc substrates are formed by a flexible synthetic resin material, as in the above-described conventional magnetic disc. That is, the disc substrate 3 is made up of a disc substrate formed by a thin film of synthetic resin on both major surfaces of which magnetic films are deposited to form a signal recording portion. The disc substrate 3 is formed as a disc having the diameter of 3.5 inch. The disc substrate 3 has a circular center opening 3a and a hub 2 is mounted for closing this center opening 3a.

Figure 11:
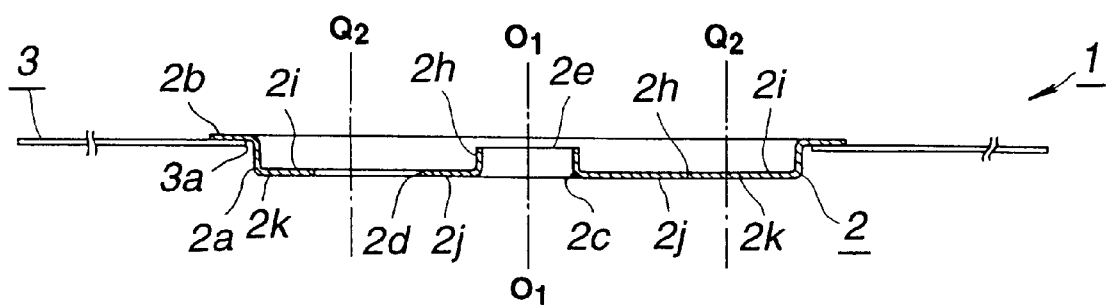
FIG. 11 is a cross-sectional view of the magnetic disc of the first embodiment.

The hub 2, mounted on the disc substrate 3, is formed of a magnetic material, such as iron, and includes a bottomed tubular center projection 2a, on the outer rim b towards an opening end of which is formed a flange 2b, as shown in FIG. 11. That is, the hub 2 is substantially in the shape of a saucer. This hub 2 is arranged on the disc substrate 3 by having a center projection 2a fitted in a center opening 3a of the disc substrate 3 and is mounted thereon by bonding the flange 2b on the rim of the center opening 3a. The hub 2 is secured to the disc substrate 3 by applying a double-sided adhesive tape, not shown, to the surface of the flange 2b facing the disc substrate 3. The double-sided adhesive tape is substantially coextensive as the flange 2b and is bonded to the surface of the flange 2b facing the disc substrate.

The hub 2 mounted on the disc substrate 3 has a circular spindle opening 2c at a mid position of the bottomed tubular projection 2a so that the opening 2c is passed through by the spindle 103 of the disc rotation unit 100 provided on the disc drive device 150. The spindle opening 2c is formed with the center thereof in register with the center O1—O1 of the hub 2 and is substantially of the same diameter as the diameter of the spindle 103 in order to permit the spindle 103 to be passed therethrough. This spindle hole 2c is formed by drawing the magnetic material making up the hub 2 and has an upstanding wall section 2e on its rim portion, as shown in FIG. 11. The upstanding wall section 2e carries the peripheral surface of the spindle 103 passed through the spindle hole 2c in order to permit the spindle 103 to be passed accurately through the spindle opening 2c.

In the projection 2a of the hub 2 is bored a driving pin engagement opening 2d, as a rectangular driving member engagement opening passed through by a driving pin 104 as a driving member provided on the disc rotation unit 100. The driving pin engagement opening 2d is spaced a pre-set distance from the spindle opening 2c. The driving pin engagement opening 2d is provided for enabling the magnetic disc 1 to be mounted on the disc rotation unit 100, on which the center opening magnetic disc can be centered and loaded, with interchangeability with the conventional magnetic disc 200. That is, the driving pin engagement opening 2d is used for preventing the driving pin 104 protruded towards the disc supporting surface 101a of the disc table 101 from abutting against the distal end of the projection 2a of the hub 2 to float the hub 2 from the disc table 101 when the magnetic disc 1 of the present invention is set on the disc supporting surface 101a of the disc table 101.

When the magnetic disc 1 of the present invention is loaded on the disc rotation unit 100 enabling loading the magnetic disc 1 with interchangeability with the magnetic disc 200, the spindle 103 is passed through the spindle opening 2c, with the driving pin 104 being passed through the driving pin engagement opening 2d.

Figure 10:
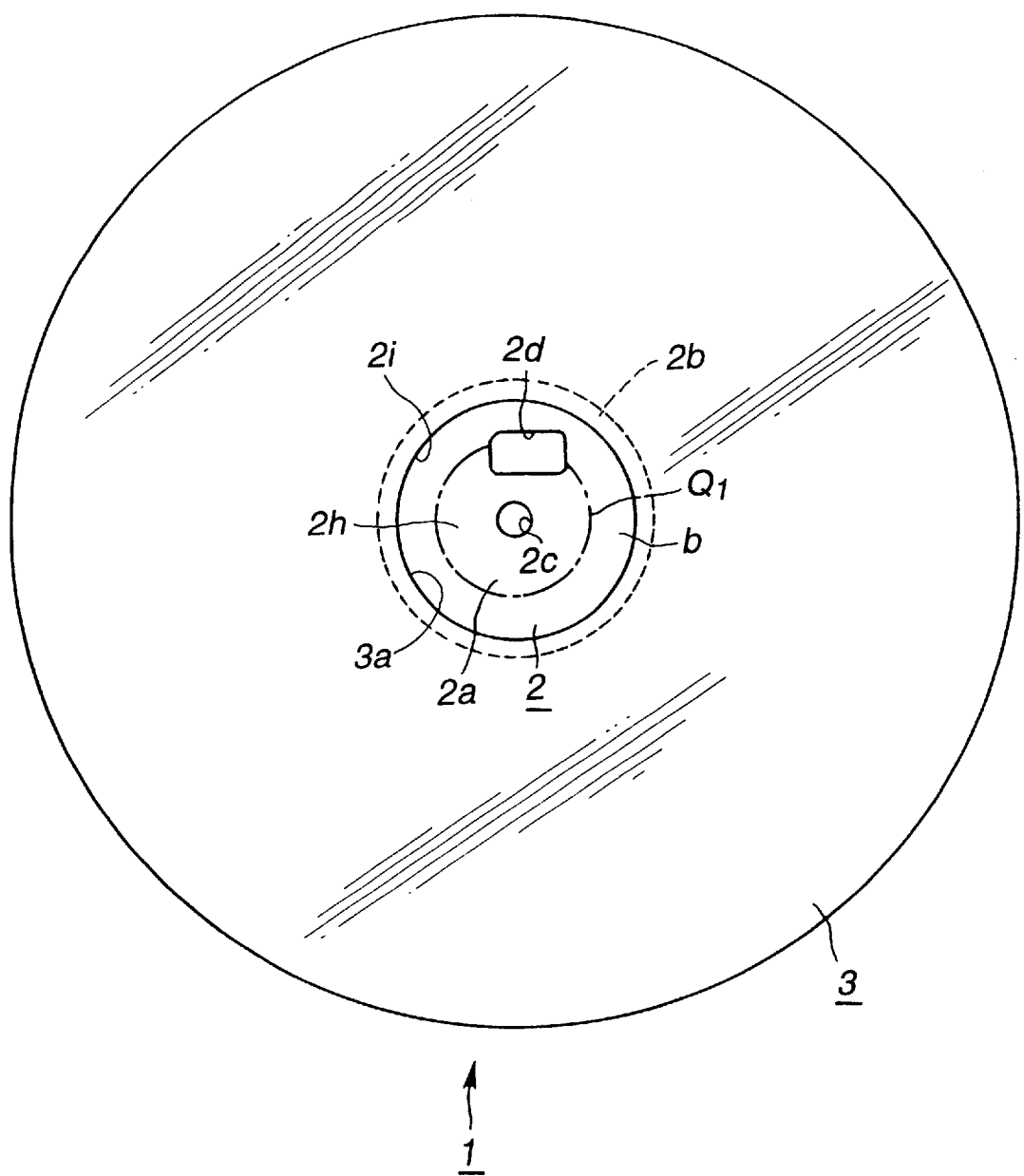
FIG. 10 is a plan view showing a first embodiment of a magnetic disc according to the present invention.

Meanwhile, the hub 2, mounted on the magnetic disc 1 of the present invention, is imaginarily divided by an imaginary chain-dotted line Q1 in FIG. 10 and by an imaginary chain-dotted line Q2 in FIG. 11 into an inner rim portion 2h and an outer rim portion 2i. The surface of the inner rim portion 2h of the hub 2 virtually divided by the imaginary lines Q1 and Q2 for facing the disc table 101 is a setting surface 2j on a hub supporting surface 110a for the hub supporting surface 101a of the disc table 101, while the surface of the outer rim portion 2i of the hub is an attraction surface 2k facing the magnet 102 provided on the disc table 101, with the setting surface 2j and the attraction surface 2k making up the major surface of the hub 2.

The technique of increasing the recording capacity of the magnetic disc 1 according to the present invention is hereinafter explained. For increasing the recording capacity of the magnetic disc 1 of the same size as the conventional magnetic disc, it is necessary to make high density recording of the information signals. For high-density recording of information signals, it is necessary to reduce the track pitch of the recording tracks. It is however difficult to realize tracking of the magnetic head for each recording track to realize a narrow track pitch based on the step feed of a stepping motor used for feeding the magnetic head as in the case of the conventional magnetic disc 200.

Thus, in the magnetic disc 1 having the high recording capacity according to the present invention, the servo information is pre-recorded and the tracking servo generally practiced in the hard disc drive based on the servo information is used.

In the magnetic disc 1 of the present invention, since the tracking servo is effectuated on the basis of the servo information recorded on the magnetic disc 1, there is no necessity of mechanical centering in which the hub 202 is abutted against the spindle 221 for centering by exploiting the biasing force of the driving pin 223 engaged in the driving pin engagement opening 202c of the hub 202 as in the case of the above-described conventional magnetic disc 200. That is, since it is unnecessary with the magnetic disc 1 of the present invention to press the hub 2 against the spindle 103 for centering, there is no necessity of providing a corner in the spindle opening 2c of the hub 2 on which the columnar-shaped spindle 103 is abutted in position. Thus, there is no necessity of forming the spindle opening 2c to a rectangular shape such that the spindle opening 2c can be formed to a circular shape in order to enable passage of the columnar-shaped spindle 103 therethrough.

Meanwhile, since the hub 202 mounted on the conventional magnetic disc 200 has a substantially square-shaped spindle opening 202b, there results non-uniform distortion during drawing for forming the spindle opening 202b. If the hub 202 is subjected to non-uniform distortion, the hub 202 cannot be set in a stable state on the disc table such that the magnetic disc cannot be rotated in stability.

With the hub 2 used in the magnetic disc 1 of the present invention, since the spindle opening 2c can be formed to a circular shape, it is possible to reduce occurrence of distortion during drawing for forming the hub 2, so that the setting surface 2j on the hub supporting surface 101a provided on the disc table 101 or the spindle opening 2c can be machined to high accuracy thus assuring high precision dimensional control.

By having the circular spindle opening 2c of the hub 2, the tensile force in the hub 2 produced at the time of molding the hub 2 by drawing a magnetic material becomes uniform, so that the distortion from the spindle opening 2c to the setting surface 2j, if produced, is uniform, thus sufficiently improving the surface accuracy of the setting surface 2j as compared to the conventional system.

Thus, with the magnetic disc of the present invention, since the setting surface 2j on the hub supporting surface 101a of the disc table 101 can be improved in accuracy, the magnetic disc 1 can be set in stability on the disc table 101 so that stable-state rotation free of planar oscillations during rotation is assured to eliminate a problem which otherwise worsens the follow-up characteristics of the magnetic heads 191, 191 relative to the signal recording portion.

The servo information for effectuating tracking servo is hereinafter explained.

Figure 12:
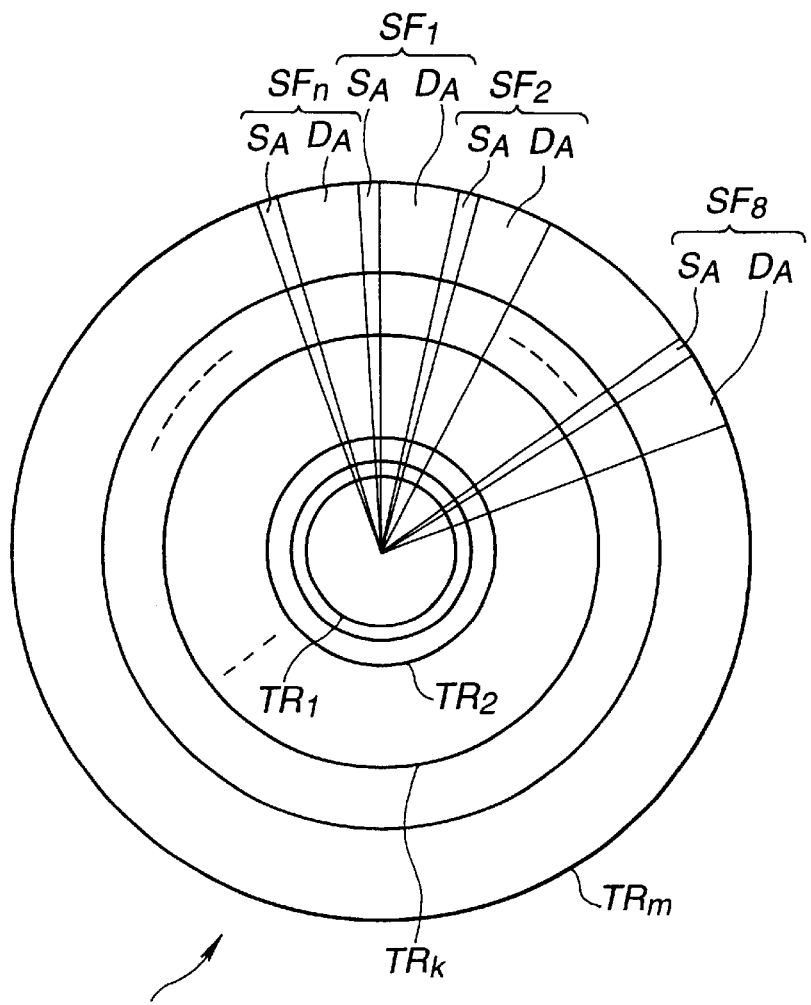
FIG. 12 is a schematic plan view showing the recording format of the magnetic disc according to the present invention.

On the signal recording portion on the major surface of the disc substrate 3 of the magnetic disc 1 according to the present invention is recorded the servo information. In the signal recording portion are formed concentric recording tracks TR1, TR2, . . . , Trk, . . . , Trm, as shown in FIG. 12. Each of the recording tracks TR1, TR2, . . . , Trk, . . . , Trm is made up of equiangular servo frames SF1, SF2, . . . , SF8, . . . , SFn arrayed in the circumferential direction. The number n of the servo frames is herein 96. Each servo frame is constituted by a servo area SA and a data area DA. In the servo area SA are recorded the circumferential position information, representing the position information of servo frames, track numbers of the track position information and tracking signals made up of burst signals for tracking servo.

Figure 13:
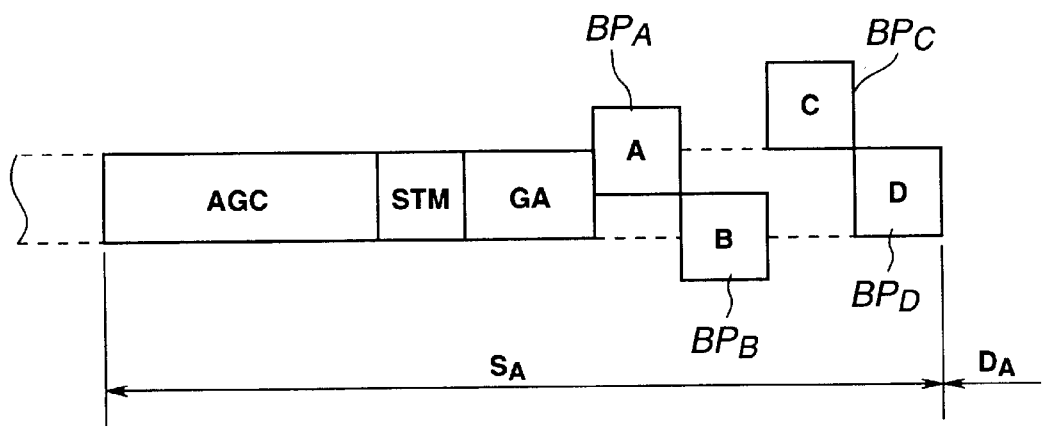
FIG. 13 is a schematic view showing the recording state of the servo information recorded on the magnetic disc according to the present invention.
Figure 14:
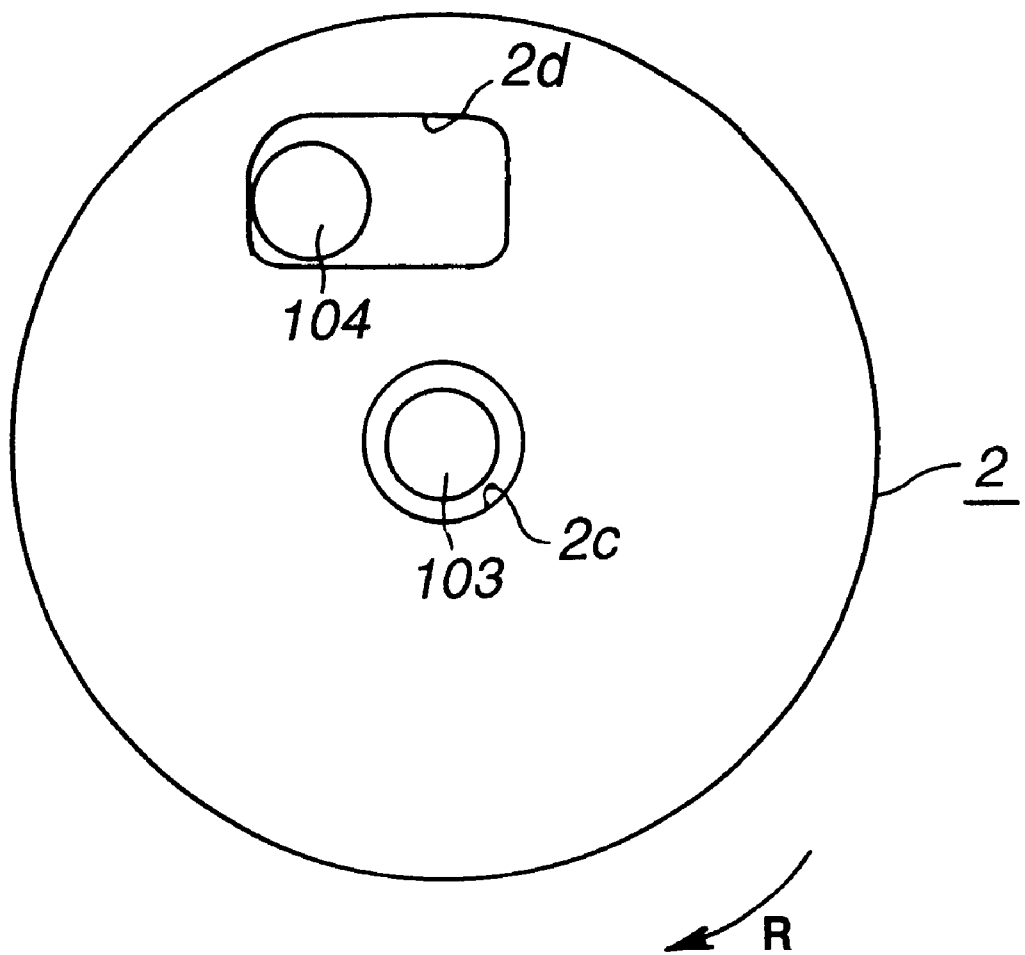
FIG. 14 is a plan view showing the state in which the hub of the magnetic disc according to the present invention has been loaded on a disc table of the disc rotation unit.

FIG. 13 shows an example of the servo area SA. The servo area SA is made up of an automatic gain control signal (AGC) signal, a servo timing mark (STM), a grey code area GA and an area having recorded therein burst patterns $BP_A$, $BP_B$, $BP_C$ and $BP_D$ for tracking servo. The AGC signals are used in the disc drive device 150 constructed as shown in FIG. 9 for controlling the AGC amplifier for signals reproduced by the magnetic heads 191, 191. The servo timing marks STM are used for detecting the timing of the servo patterns.

The burst patterns $BP_A$, $BP_B$, $BP_C$ and $BP_D$ are pattern signals each recorded with a sole frequency. The burst patterns $BP_A$, $BP_B$, $BP_C$ and $BP_D$ are each formed at a width TP (TP being track pitch) along the center axis of the track. The C-layer burst pattern $BP_C$, is formed with its center aligned with the center of an odd-numbered track, while the D-layer burst pattern $BP_D$ is formed with its center aligned with the center of an even-numbered track. The A-layer burst pattern $BP_A$ and the B-layer burst pattern $BP_B$ are formed by offsetting the C-layer burst pattern $BP_C$ and the D-layer burst pattern $BP_D$ by TP/2 along the radial direction.

Since the burst patterns $BP_A$, $BP_B$, $BP_C$ and $BP_D$ for tracking servo are pre-recorded on the magnetic disc 1 of the present invention, as described above, there is no necessity of effectuating centering about the spindle by interengagement of the driving pin and the driving pin engagement opening as in the conventional magnetic disc. Thus, in the magnetic disc 1 according to the present invention, there is no necessity of effectuating centering about the spindle as in the conventional system so that there is no necessity of providing the driving pin engagement opening 2d. Therefore, with the magnetic disc 1 of the present invention, there is no necessity of providing a driving pin engagement opening for mechanical centering about the spindle. However, in order for the magnetic disc 1 to be loaded with interchangeability on the conventional disc drive device 150 capable of loading the conventional magnetic disc 200 thereon, there is formed the driving pin engagement opening 2d in the hub 2.

Since the servo information for effectuating tracking servo is pre-recorded on the magnetic disc according to the present invention, tracking of the magnetic head 191, 191 with respect to each recording track can be achieved even if the magnetic disc 1 according to the present invention is loaded on the disc table 101 in a state devoid of mechanical centering, with the driving pin 104 inserted through the driving pin engagement opening 2d and with the driving pin 104 pressed against the peripheral surface of the driving pin engagement opening 2d to press the spindle 103 against the spindle opening 2c. That is, with the magnetic disc 1 of the present invention, tracking servo can be realized based on the servo information pre-recorded in the signal recording portion even in the absence of the mechanical centering with respect to the disc table 101.

With the magnetic disc 1 of the present invention, tracking servo can be realized on the basis of the servo information pre-recorded on the signal recording portion, it is unnecessary for the spindle 103 of the disc rotation unit 100 to have a tight fit in the spindle opening 2c of the hub 2. That is, there may be left a gap between the spindle 103 and the spindle opening 2c within a range of realizing tracking servo based on the servo information. By providing the gap between the spindle 103 and the spindle opening 2c, the spindle 103 can be easily interengaged with the spindle opening 2c. If the diameter of the spindle 103 is 4.008±0.007 mm, the spindle opening 2c can have an inner diameter slightly larger than the maximum tolerance value of the diameter of the spindle 103.

Similarly to the conventional magnetic disc 200, the magnetic disc 1 according to the present invention is formed using a flexible disc substrate 3. Therefore, it is liable to be damaged. Thus, similarly to the conventional magnetic disc 200, the magnetic disc 1 of the present invention is formed as a disc cartridge 10 held in the main cartridge body portion 13, and is loaded on the loading unit within the disc drive device 150 as it is housed in the disc cartridge 10. The magnetic disc 1, housed in the disc cartridge 10, is loaded on the disc table 101 of the disc rotation unit 100 as the disc is held in the disc cartridge 10.

Figure 15:
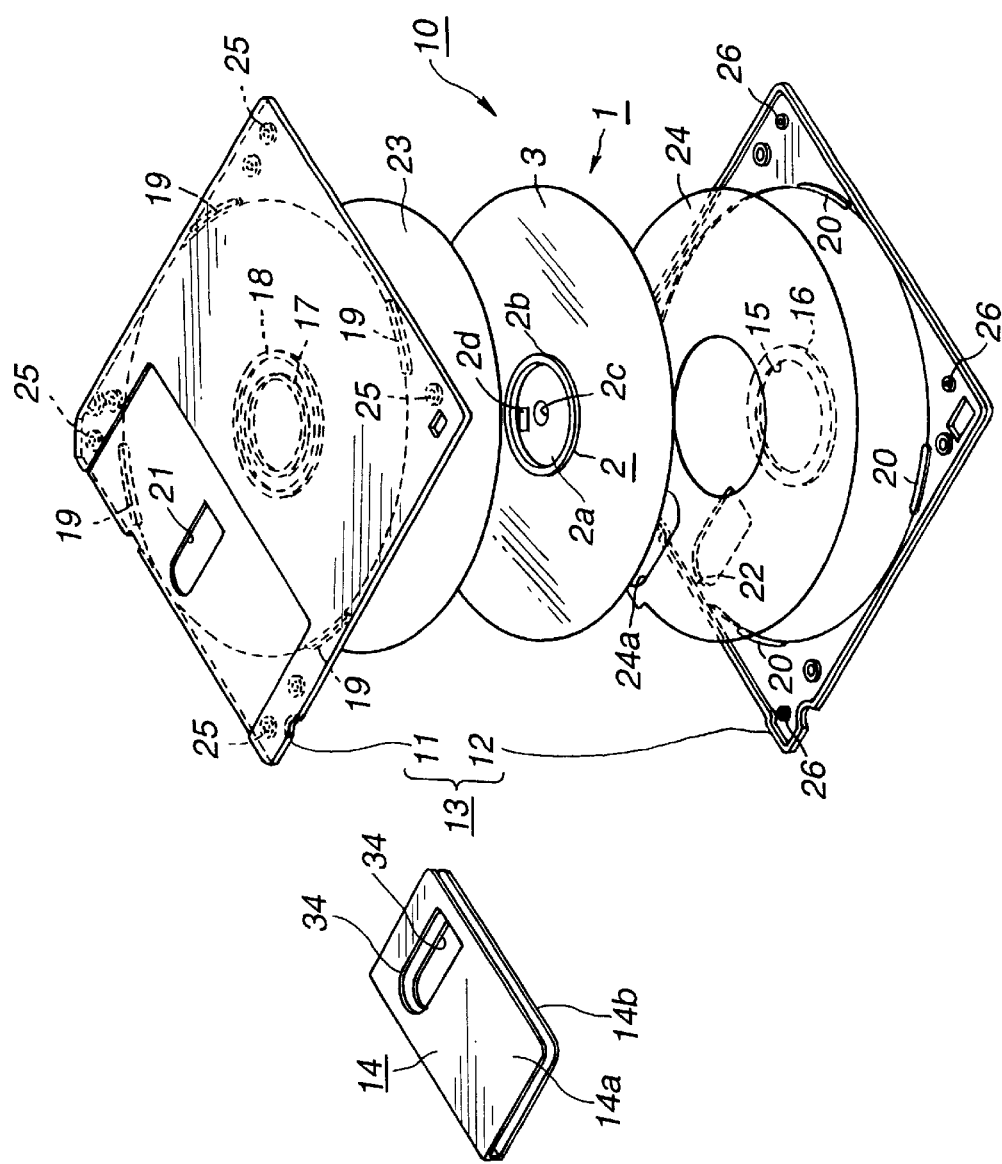
FIG. 15 is an exploded perspective view showing a disc cartridge according to the present invention holding a magnetic disc according to the present invention.

The disc cartridge 10 of the present invention, holding the magnetic disc 1 according to the present invention, has a rectangular main cartridge body portion 13 obtained on abutting and interconnecting an upper cartridge half 11 and a lower cartridge half 12, obtained on molding a synthetic resin material containing an anti-static agent, such as an ABS resin, and holds the magnetic disc 1 in the main cartridge body portion 13, as shown in FIG. 15. The upper cartridge half 11 and the lower cartridge half 12 are abutted to form the main cartridge body portion 13, with welding projections 25, 26 and upstanding peripheral wall sections abutting to each other, and by bonding the abutting portions together by ultrasonic welding.

Figure 17:
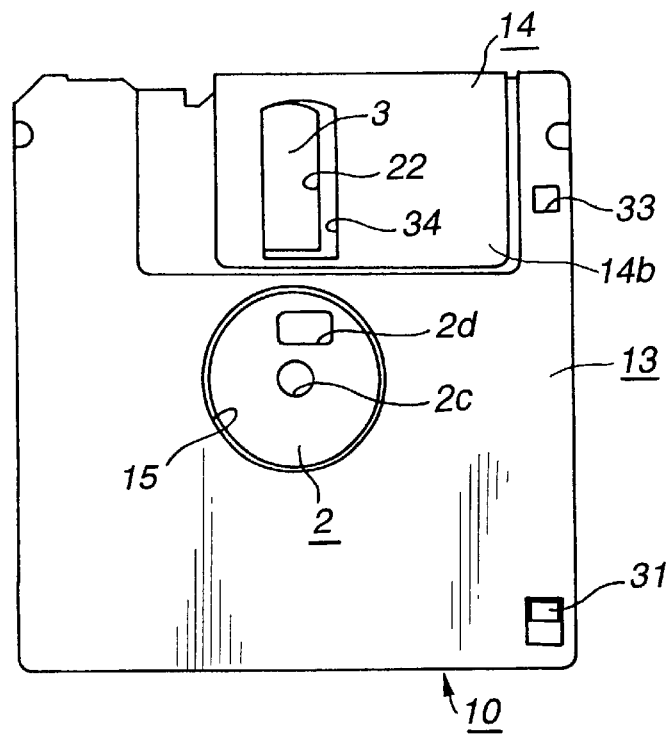
FIG. 17 is bottom view showing a disc cartridge according to the present invention.

At a mid portion of the lower cartridge half 12 constituting the lower surface of the main cartridge body portion 13 is formed a circular center opening 15, as shown in FIG. 17. The rim of the inner surface of the circular center opening 15 is formed as-one with an annular projection 16. The magnetic disc 1 is housed in the main cartridge body portion 13 by having the hub 2 fitted in the circular center opening 15 and by having a portion in register with the flange 2b of the hub 2 supported by the annular projection 16.

At a mid portion on the inner surface of the upper cartridge half 11 constituting the upper surface of the main cartridge body portion 13 is protuberantly formed an annular projection 17 engaged with the inner rim of the hub 2 mounted on the magnetic disc 1. The magnetic disc 1 housed in the main cartridge body portion 13 has its movement in a direction parallel to its major surfaces limited by the annular projection 17 engaged with the hub 2. The outer peripheral side of the annular projection 17 is formed with an annular projection 18 constituting a mounting portion for a protective sheet as later explained.

The inner surfaces of the upper and lower halves 11, 12 are formed with four protuberant arcuate ribs 19, 20 inscribing the upper and lower halves 11, 12. These ribs 19, 20 are abutted to one another to constitute a disc housing section. The magnetic disc 1 is housed in the main cartridge body portion 13 by being housed within the disc housing section defined by the ribs 19, 20.

Since the distance from the center of the circular center opening 15 of the lower cartridge half 12 to the ribs 19, 20 is slightly larger than the radius of the magnetic disc 1, the hub 2 can be fitted with allowance in the circular center opening 15 so that the rim of the magnetic disc 1 is not contacted with the ribs 19, 20 even if the magnetic disc 1 is moved slightly in a direction parallel to its major surface.

Figure 16:
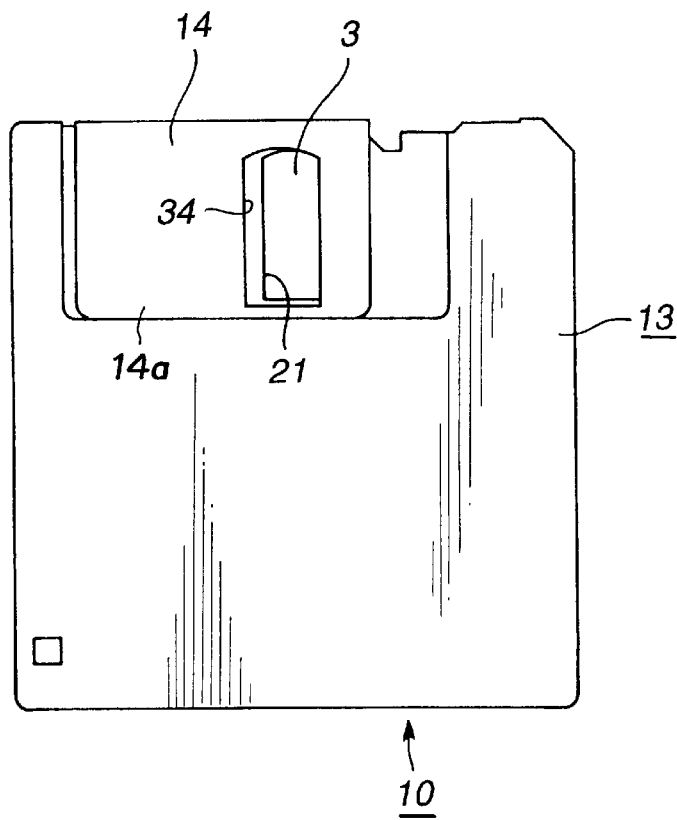
FIG. 16 is a plan view showing a disc cartridge according to the present invention.

In the facing positions of the upper and lower halves 11, 12 of the main cartridge body portion 13 in a mid portion in the left-and-right direction are formed rectangular apertures 21, 22 for the magnetic head for extending from the vicinity of the center portion as far as the front side of the main cartridge body portion 13, as shown in FIGS. 16 and 17. The magnetic disc 1 housed in the main cartridge body portion 13 has its signal recording surface partially exposed to outside across the inner and outer rims of the disc.

On the inner surface of the main cartridge body portion 13 are bonded substantially ring-shaped protective sheets 23, 24 formed by, for example, non-woven cloths. These protective sheets 23, 24 prevent the signal recording surface of the magnetic disc 1 from contacting with the inner surface of the main cartridge body portion 13 formed by synthetic resin to injure the main cartridge body portion 13. The portions of the protective sheets 23, 24 in register with the apertures 23, 24 are formed with radially extending cut-outs 24a for not closing the apertures 21, 22.

The main cartridge body portion 13 is provided with a mistaken recording inhibiting hole 31, operating as a discriminating hole for indicating whether or not information signals recorded on the magnetic disc held therein can be erased by overwriting or erasure, and a disc discriminating hole 33 for indicating that the housed magnetic disc 1 is a magnetic disc of high recording capacity of the present invention capable of recording information signals to high density. This disc discriminating hole 33 is provided at a corner of lateral side of the main cartridge body portion 13 provided with the apertures 21, 22 for the magnetic head for specifying that the magnetic disc 1 housed therein is of a high recording capacity as shown in FIG. 17. By this disc discriminating hole 33, it is indicated that the disc cartridge 10 holds the magnetic disc 1 of the high recording capacity according to the present invention. By detection of the disc discriminating hole 33, the disc cartridge is found to be a magnetic disc 10 holding the magnetic disc 1 of the high recording capacity.

The disc cartridge 10 according to the present invention mounts a shutter member 14 adapted for opening/closing apertures 21, 22 for a magnetic head. The shutter member 14 is formed by a plate of metals, such as aluminum or stainless steel, or molded from a synthetic resin to a U-shaped cross-section, and is fitted from the front side of the main cartridge body portion 13 for covering the apertures 21, 22. Moreover, the shutter member 14 is mounted for movement in a direction of opening or closing the apertures 21, 22. The shutter member 14 includes shutter portions 14a, 14b formed with apertures 34 which, when the shutter member 14 is moved to a position of opening the apertures 21, are in register with the apertures 21, 22.

The magnetic disc 1 according to the present invention, rotatably housed in the disc cartridge 10, is inserted into the disc drive device 150 as it is housed in the disc cartridge 10, and is loaded on the disc table 101 of the disc rotation unit 100.

Figure 18:
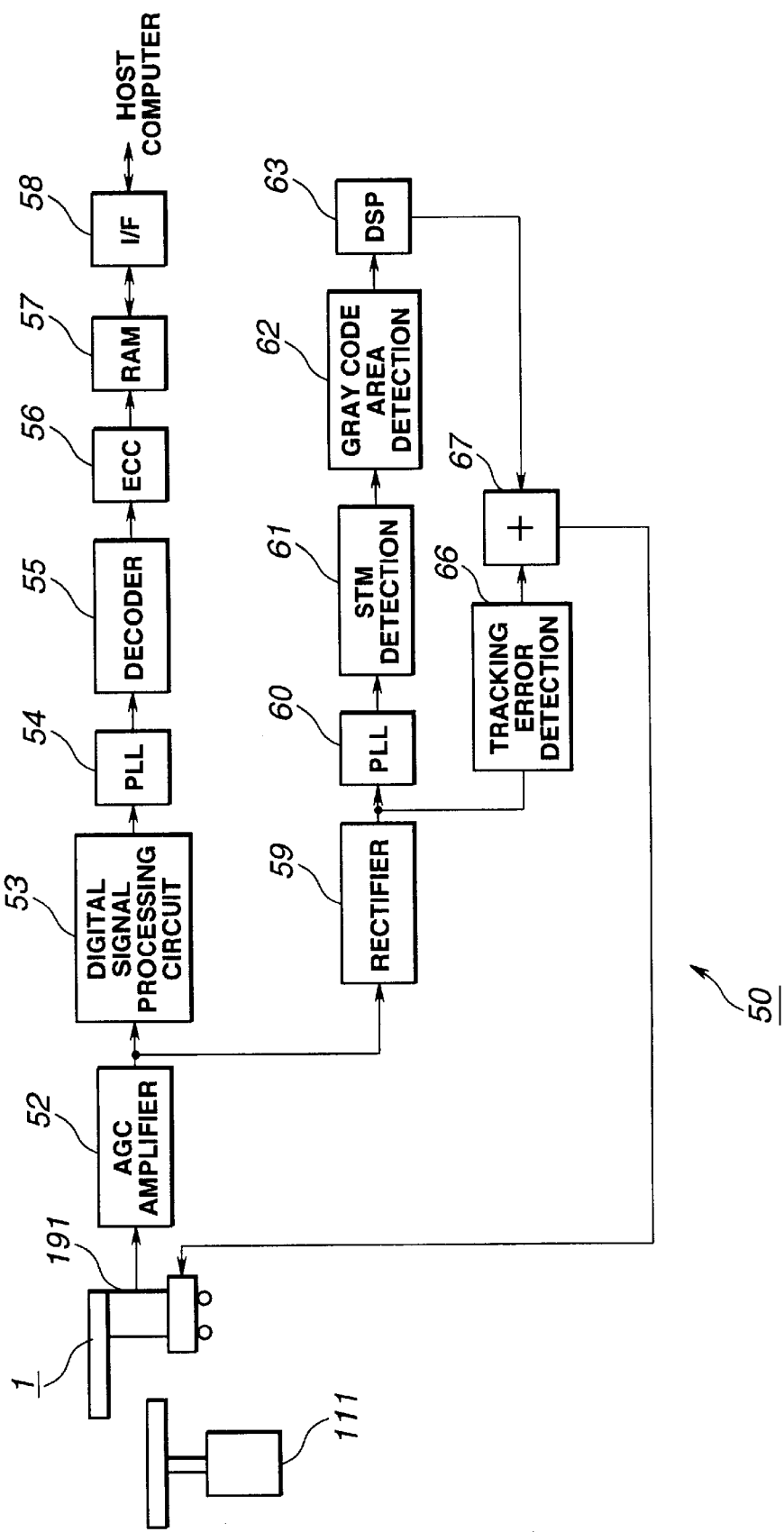
FIG. 18 is a block circuit diagram of a disc drive device on which are selectively loaded a magnetic disc according to the present invention and a conventional magnetic disc.

Reference is had to FIG. 18 which shows a block circuit diagram of the disc drive device 150 of FIG. 9 on which the magnetic disc 1 according to the present invention or the conventional magnetic disc can be used selectively. In FIG. 18, only the reproducing system is shown, while the recording system is omitted for simplicity.

A disc recording/reproducing apparatus 50 includes magnetic heads 191, 191 for reproducing information signals recorded in the signal recording portion of the magnetic disc according to the present invention or the conventional magnetic disc 200, and an AGC amplifier 52 for amplifying playback signals outputted by the magnetic heads 191, 191 to a predetermined value to output the amplified signals. The disc recording/reproducing apparatus 50 also includes a digital signal processing circuit 53 for digitizing and outputting playback signals amplified by the AGC amplifier 52 and a PLL circuit 54 for detecting clock signals from the digital signals from the digital signal processing circuit 53 for synchronization. The disc recording/reproducing apparatus 50 also includes a decoder 55 for decoding the digital signals synchronized by the PLL circuit 54 and an ECC circuit 56 for correcting the digital signals decoded and outputted by the decoder 55 and a RAM 57 for temporarily storing the digital signals outputted by the ECC circuit 56. The disc recording/reproducing apparatus 50 also includes an interface 58 for effectuating output control of the digital signals stored in the RAM 57 to the host computer.

The disc recording/reproducing apparatus 50 also includes a rectifier circuit 59 for rectifying and outputting reproduced signals from the magnetic heads 191, 191, and a PLL circuit 60 for detecting and synchronizing clock signals from the playback signals outputted by the rectifier circuit 59. The disc recording/reproducing apparatus 50 also includes a servo timing mark (STM) detection circuit 61 for detecting servo timing marks contained in signals from the PLL circuit 60 for outputting signals synchronized with the servo timing, and a grey code area detection circuit 62 synchronized with the synchronization signal outputted by the STM detection circuit 61 to read the servo frame information recorded in the grey code area of the disc. The disc recording/reproducing apparatus 50 also includes a digital signal processing (DSP) circuit 63 for discriminating and processing the information in the grey code area detected by the grey code area detection circuit 62. The disc recording/reproducing apparatus 50 also includes a tracking error detection circuit 66 for detecting tracking error signals based on the output signal of the rectifier circuit 59 and a mixing circuit 67 for sending to the magnetic heads 191, 191 an output signal of the DSP circuit 63, for example, a track seek signal, and the tracking error signal outputted by the tracking error detection circuit 66, to the magnetic heads 191, 191. The disc recording/reproducing apparatus 50 additionally includes a spindle motor 111 for rotationally driving the magnetic disc 1. By having this configuration, the disc drive device 150 can selectively use the magnetic disc 1 according to the present invention or the conventional magnetic disc 200 and can also apply tracking servo to the high recording capacity magnetic disc 1 according to the present invention.

Figure 19:
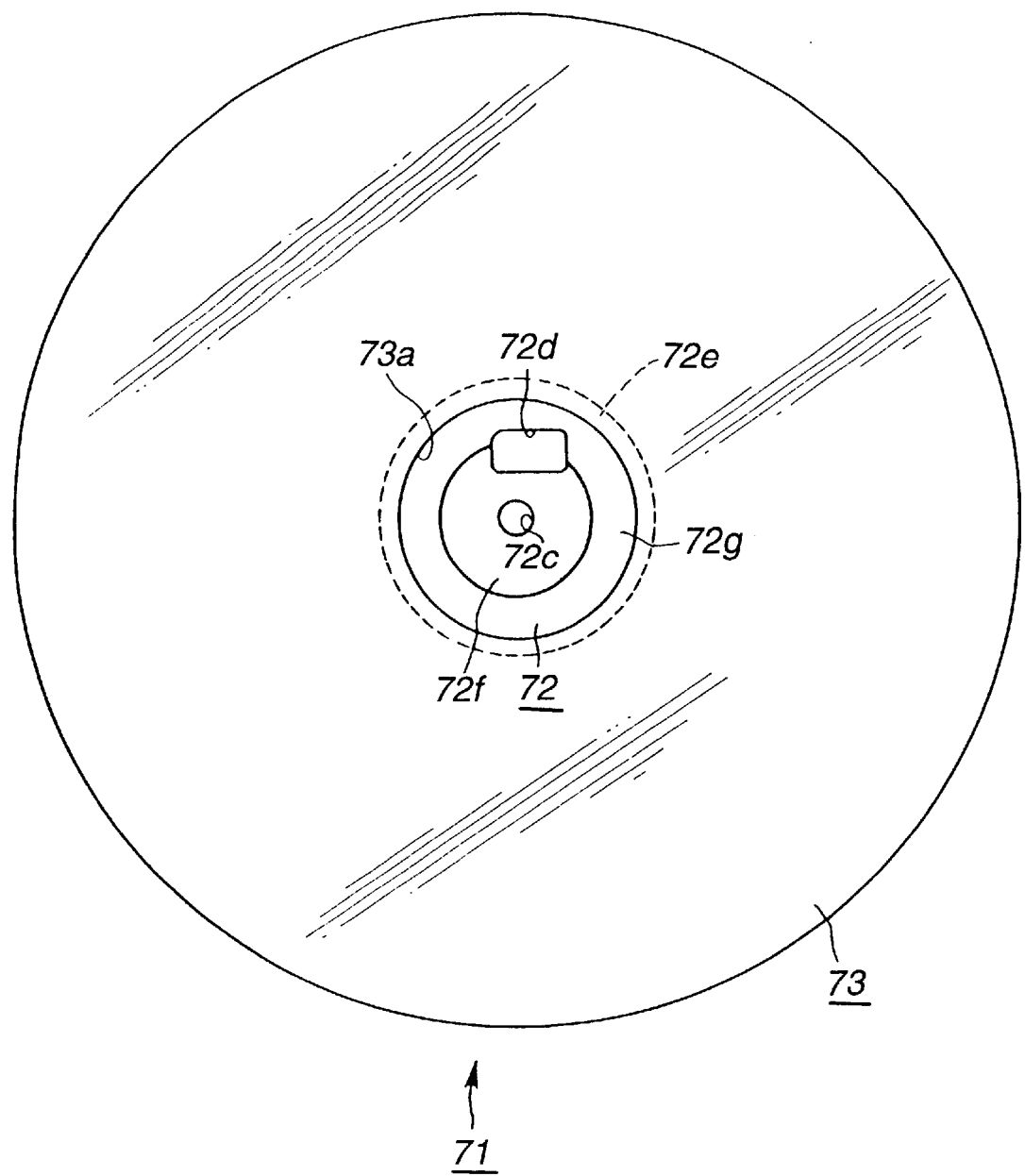
FIG. 19 is a plan view showing a second embodiment of the magnetic disc according to the present invention.
Figure 20:
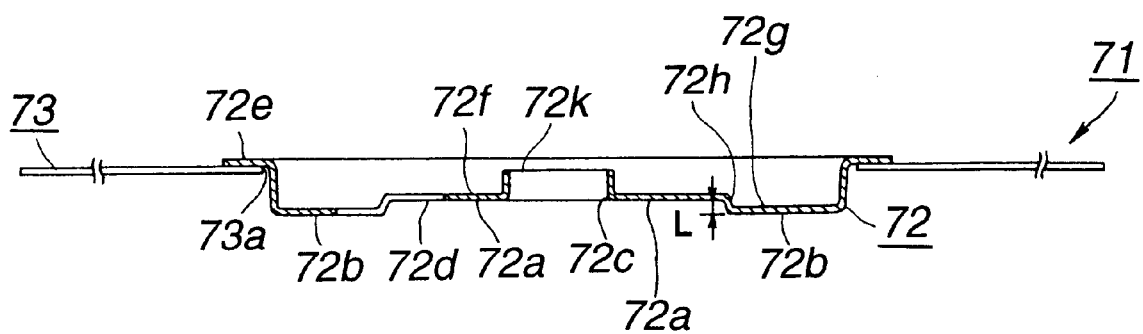
FIG. 20 is a cross-sectional view of the magnetic disc of the second embodiment.

Referring to FIGS. 19 and 20, a second embodiment of the magnetic disc of the present invention is explained.

FIGS. 19 and 20 show a magnetic disc 71 which, similarly to the above-described magnetic disc 1, has a disc substrate 73 which is formed by a flexible synthetic resin film. That is, the disc substrate 73 has a signal recording portion of magnetic films deposited on both major surfaces of the disc substrate formed by a thin film of synthetic resin. The disc substrate 73 is formed as a circle 3.5 inch in diameter. The disc substrate 73 includes a circular center opening 73a. A hub 72 is mounted for closing the circular center opening 73.

The hub 72, mounted on the disc substrate 73, includes an inner rim portion 72f, having a circular outer shape, and an outer rim portion 72g of a circular outer shape formed on the outer rim side of the inner rim portion 72f. The hub 72 also includes a connecting portion 72h, interconnecting the inner rim portion 72f and the outer rim portion 72g and a flange 72e formed on the outer rim of the outer rim portion 72g, as shown in FIGS. 19 and 20. This hub 2 is mounted on the disc substrate 73 by inserting the inner and outer rim portions 72f and 72g through a center opening 73a provided in the disc substrate 73, retaining the flange 72e on the rim of the circular center opening 73a of the flange 72e and by bonding the retained portions such as with an adhesive.

That is, the hub 72 is formed to a bottomed saucer shape and is mounted on the disc substrate 73 by bonding the flange 72e on the outer rim of the end of the outer rim portion 72g to the rim of the circular center opening 73a provided on the disc substrate 73 and by securing the inner and outer rim portions 72f and 72g to the disc substrate 73 so that the inner and outer rim portions 72f and 72g are protruded from the disc substrate 73.

The outer rim portion 72g is formed so as to be protruded a distance L from the inner rim portion 72f from the major surface of the disc substrate 73. The amount of protrusion L from the inner rim portion 72f of the outer rim portion 72g is selected to, for example, 0.25 mm. This outer rim portion 72g serves for adjusting the distance from the magnet 102 provided on the disc table 101 of the disc rotation unit 100 for adjusting the force of attraction of the hub 72 of the magnet 102 on loading the magnetic disc 71 on the disc table 101.

In the center of the hub 72 is formed a spindle opening 72c passed through by the spindle 103 provided on the disc rotation unit 100 when the magnetic disc 71 is mounted on the disc rotation unit 100. This spindle opening 72c is circular in profile to permit the spindle 103 to be passed therethrough, as in the above-described magnetic disc 1. There is provided in the hub 72 a chuck pin engagement opening 72d at a position offset from the center so as to be spaced a predetermined distance from the spindle opening 72c. On the surface of the flange 72e facing the disc substrate 73 is bonded a double-sided adhesive sheet substantially coextensive as the flange 72e. The hub 72 is bonded by this double-sided adhesive sheet to the disc substrate 73.

The hub 72, mounted on the disc substrate 73, has an outer surface of the inner rim portion 72f projected from the disc substrate 73 as a setting surface 72a for the hub supporting surface 101a provided on the disc table 101 of the disc rotation unit 100. The outer surface of the outer rim portion 72g protruded from the inner rim portion 72f is a suction surface 72b facing the magnet 102 provided on the disc table 101.

With the hub 72 used for the magnetic disc 71, since the spindle opening 72c is circular in shape, the hub 72 used for the magnetic disc 71 suffers for distortion during drawing for forming the hub 72, only to a lesser extent. Thus, the suction surface 72a for the hub supporting surface 101a provided on the disc table 101, suction surface 72b of the magnet 72 or the spindle opening 72c can be machined highly accurately to assure a high degree of dimensional accuracy. Specifically, by having the circular spindle opening 72c of the hub 72, the tensile force in the hub 72 generated during formation of the hub 72 by drawing a magnetic material is uniform, so that distortion occasionally produced from the spindle opening 72c to the setting surface 72a and to the attraction surface 72a is uniform thus sufficiently improving the surface accuracy of the setting surface 72a and the attraction surface 72b as compared to those in the conventional system.

On the rim of the spindle opening 72c, there is formed an upstanding wall section 72k simultaneously with drawing of the spindle opening 72c. This upstanding wall section 72k supports the peripheral surface of the spindle 103 inserted into the spindle opening 72c to realize stable insertion of the spindle 72 into the spindle opening 72c.

Since the magnetic disc 71, similarly to the magnetic disc 1, is constituted using the flexible disc substrate 73, it is susceptible to damages. Thus, the magnetic disc 71 of the present embodiment, similarly to the above-described magnetic disc 1, is constituted as a disc cartridge 10 held in the main cartridge body portion 13, and is loaded on the cartridge loading unit in the disc drive device 150 in a state of being held in the disc cartridge 10. The magnetic disc 1, held in the disc cartridge 10, is loaded on the disc table 101 of the disc rotation unit 100 as it is held in the disc cartridge 10.

Figure 21:
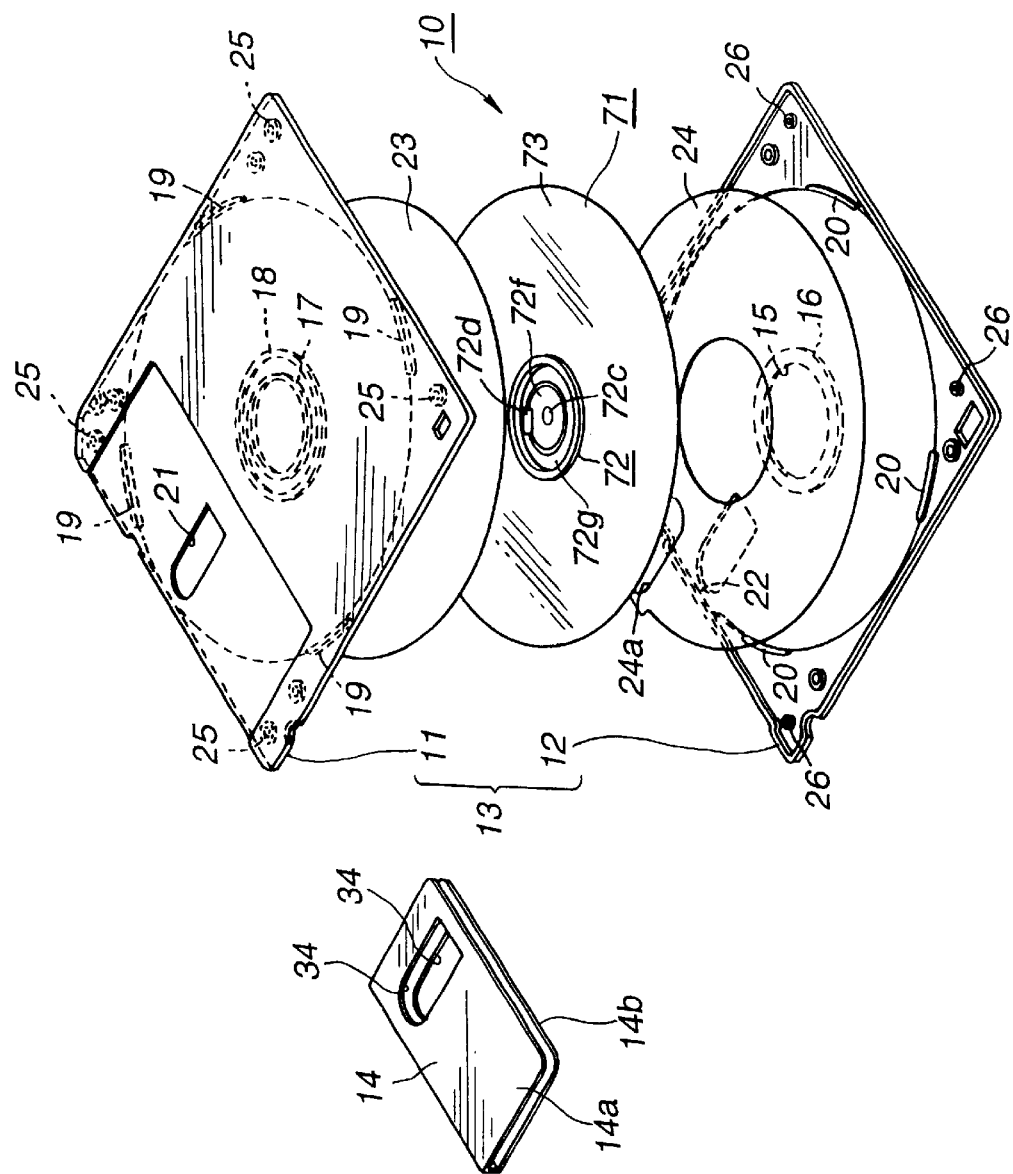
FIG. 21 is an exploded perspective view showing a disc cartridge according to the present invention holding the second embodiment of the magnetic disc according to the present invention.
Figure 22:
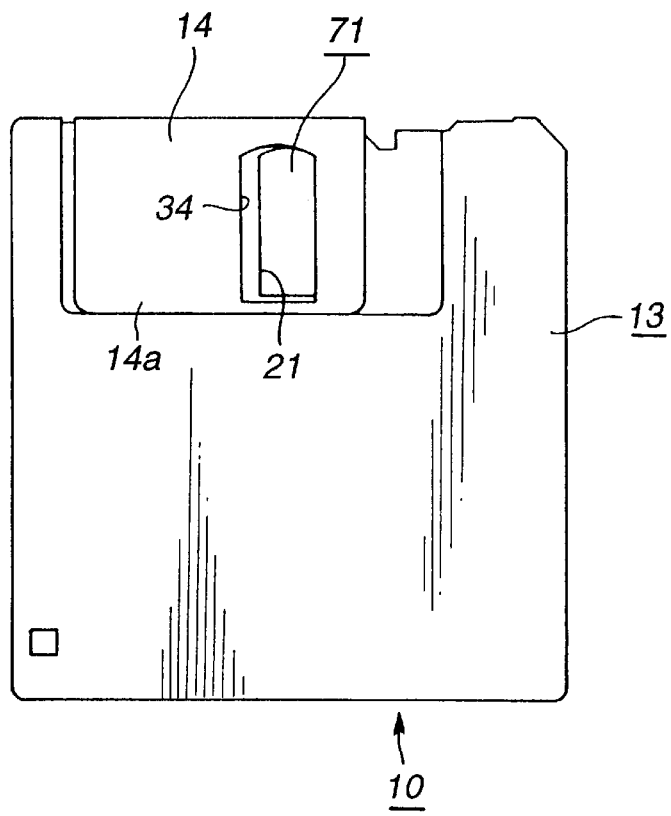
FIG. 22 is a plan view of the disc cartridge shown in FIG. 21.
Figure 23:
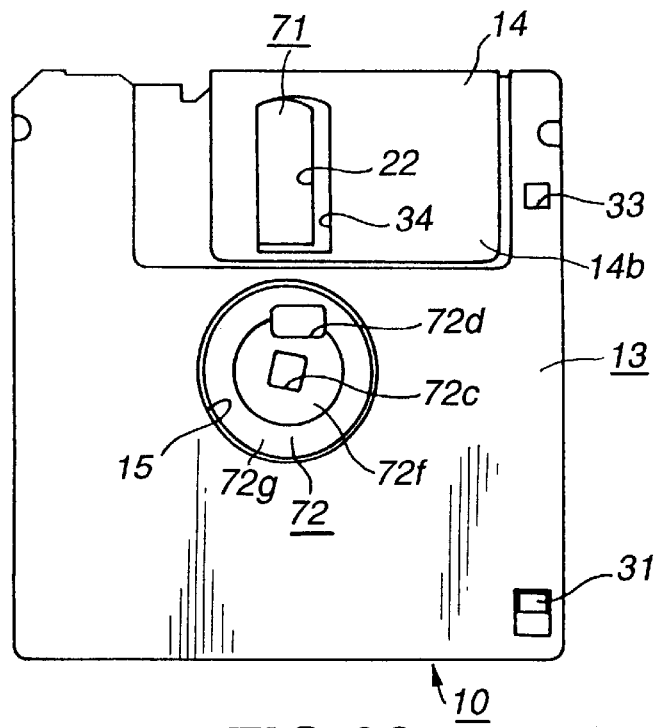
FIG. 23 is a bottom view of the disc cartridge shown in FIG. 21.

The disc cartridge 10, holding the magnetic disc 71 shown in the present embodiment, includes a main cartridge body portion 13, formed by abutting and connecting the upper cartridge half 11 and the lower cartridge half 12 to each other, and holds a magnetic disc 71 for rotation therein, as shown in FIGS. 21 to 23.

The structure of the main cartridge body portion 13 is common to that shown in FIGS. 15 to 17 so that common portions are depicted by the common numerals and the detailed description is omitted for clarity.

The magnetic disc 71 is held in the main cartridge body portion 13 by having the hub 72 fitted in the circular center opening 15 and by having its portion in register with the flange 72e of the hub 72 supported by the annular projection 16, as shown in FIGS. 21 and 23. At this time, the hub 72 mounted on the magnetic disc 71 has its outer rim portion 72g projected to the lower side of the main cartridge body portion 13 more prominently than its inner rim portion 72f, when looking from the side of the circular center opening 15 which is the lower side surface of the main cartridge body portion 13.

This main cartridge body portion 13 similarly has a mistaken recording inhibiting hole 31 for indicating whether or not the information signals recorded on the magnetic disc 71 held therein can be erased by overwriting or erasure and a disc discriminating hole 33 for indicating that the magnetic disc 1 of high recording capacity is held therein, as shown in FIGS. 22 and 23.

Figure 24:
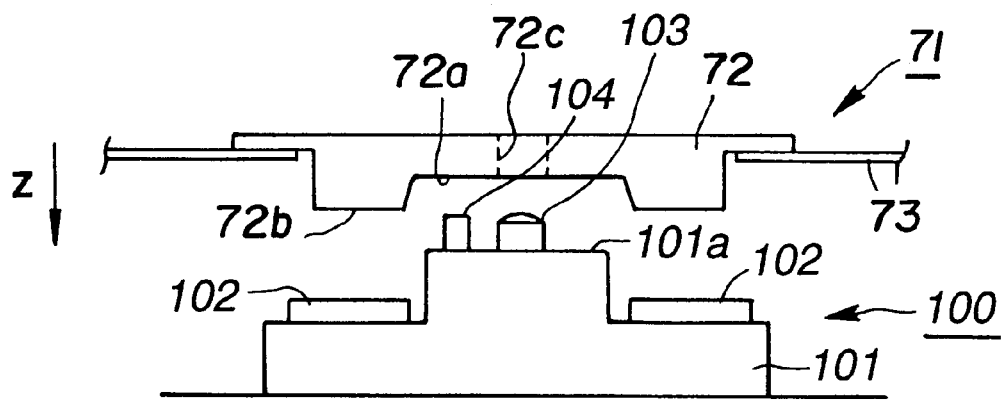
FIG. 24 is a perspective view showing the state of mounting a magnetic disc of the second embodiment of the present invention on the disc rotation unit.
Figure 25:
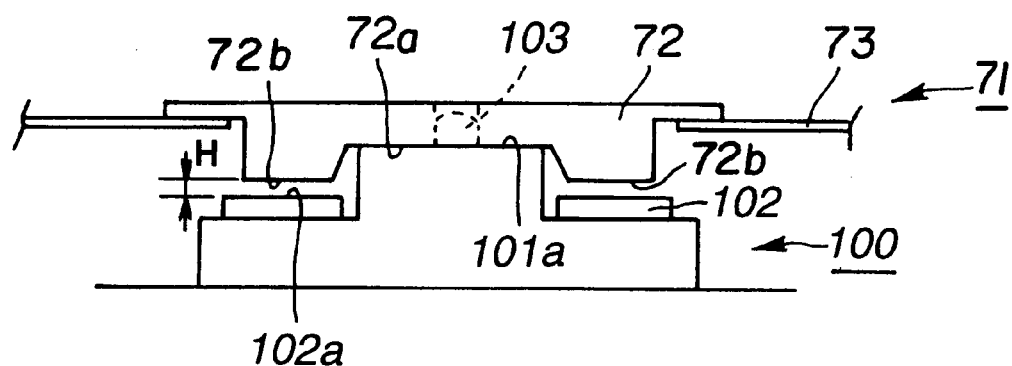
FIG. 25 is a perspective view showing the state in which the magnetic disc of the second embodiment of the present invention has been loaded on the disc rotation unit.

The state of mounting the magnetic disc 71 of the present embodiment on the disc table 101 of the disc rotation unit 100 is explained with reference to FIGS. 24 and 25.

In these figures, only the magnetic disc 71 is shown, while the main cartridge body portion 13 is omitted from the drawing.

The magnetic disc 71 is inserted into the disc drive device as the disc is held in the disc cartridge 10. The disc cartridge 10, inserted into the disc drive device, is held by the cartridge holder 159. On insertion of the disc cartridge 10 into the cartridge holder 159, the latter is lowered to the disc rotation unit 100 so as to be loaded in position on the cartridge loading unit provided on the base 151. As the disc cartridge 10 is loaded on the cartridge loading unit, the magnetic disc 71 housed in the disc cartridge 10 is lowered towards the disc rotation unit 100 in the direction indicated by arrow Z in FIG. 24 so as to be set on the disc table 101 constituting the disc rotation unit 100. At this time, the setting surface 72a formed on the inner rim portion 72f of the hub 72 of the magnetic disc 71 is supported on the hub supporting surface 101a of the disc table 101, while the attraction surface 72b of the outer rim portion 72g formed with a step difference on the outer rim of the inner rim portion 72f faces the facing surface 102a at a pre-set distance H.

At this time, the spindle 103 is passed through the spindle opening 72c of the hub 72, with the driving pin 104 being inserted through the driving pin engagement opening 72d.

Figure 1:
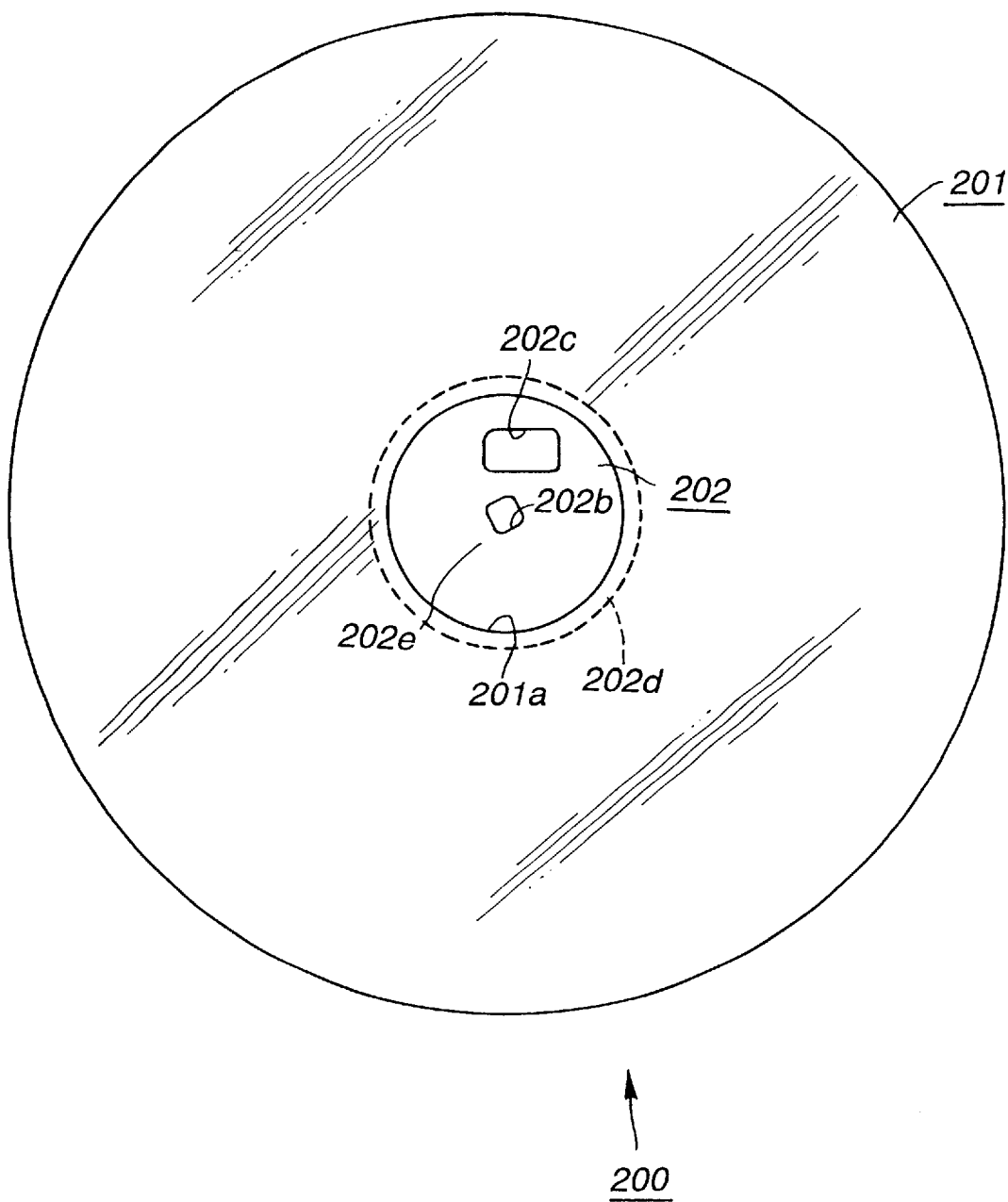
FIG. 1 is a plan view showing a conventional magnetic disc.
Figure 2:
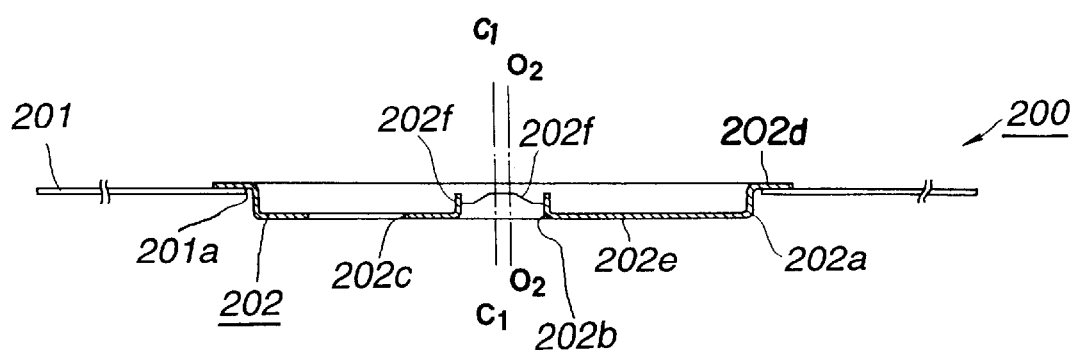
FIG. 2 is a cross-sectional view of the magnetic disc shown in FIG. 1.
Figure 3:
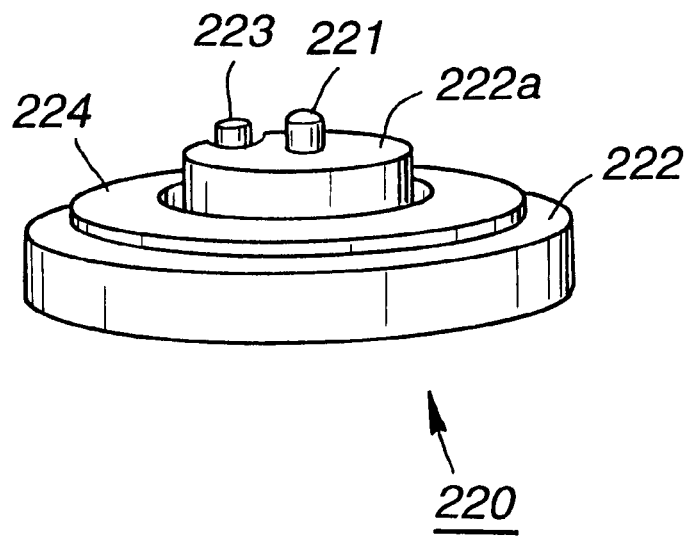
FIG. 3 is a perspective view showing a disc rotation unit on which is loaded a conventional magnetic disc.
Figure 4:
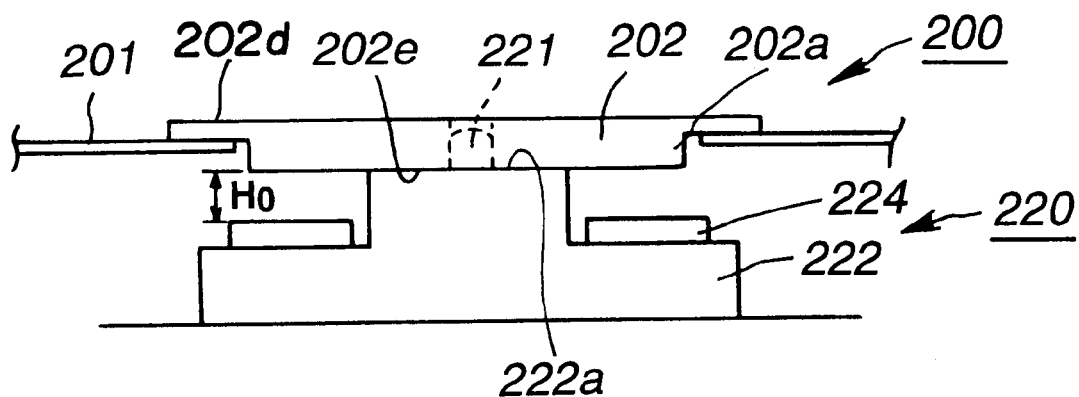
FIG. 4 is a side view showing the state in which the conventional magnetic disc is loaded on the disc rotation unit.
Figure 5:
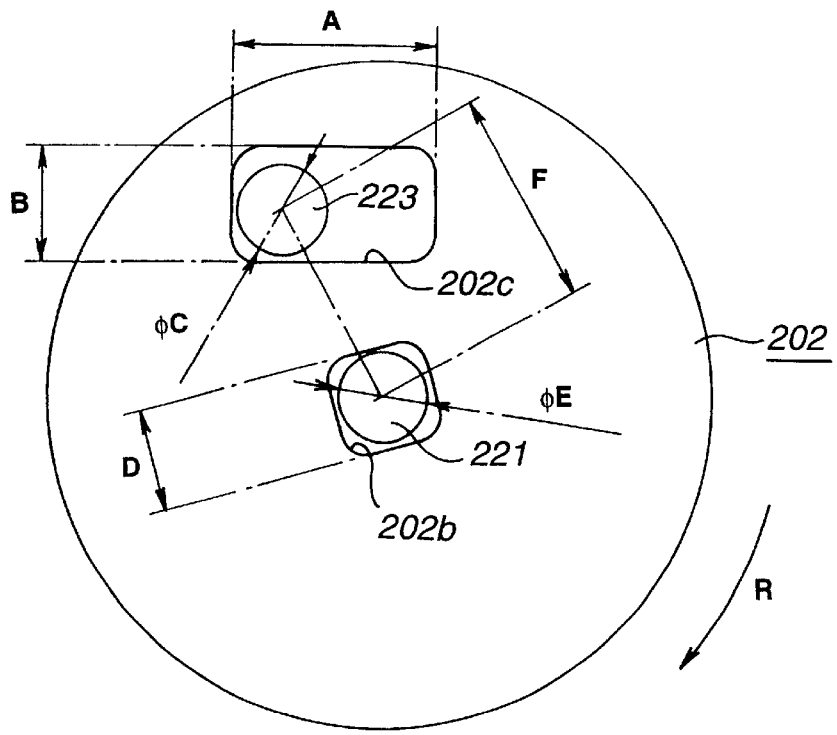
FIG. 5 is a plan view showing an initial state in which the conventional magnetic disc has been set on a disc table.
Figure 6:
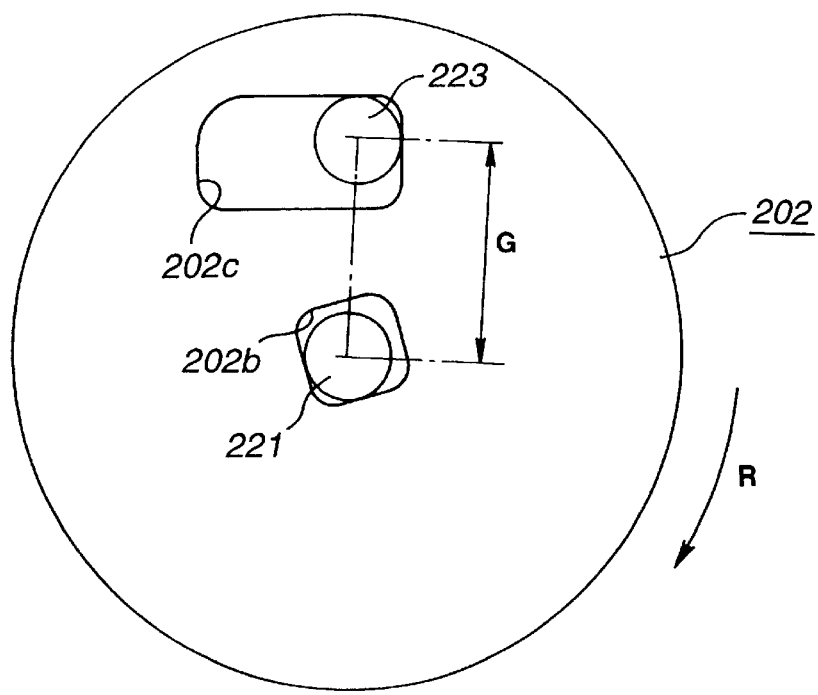
FIG. 6 is a plan view showing the state in which the conventional magnetic disc has been centered and loaded on a disc table.
Figure 7:
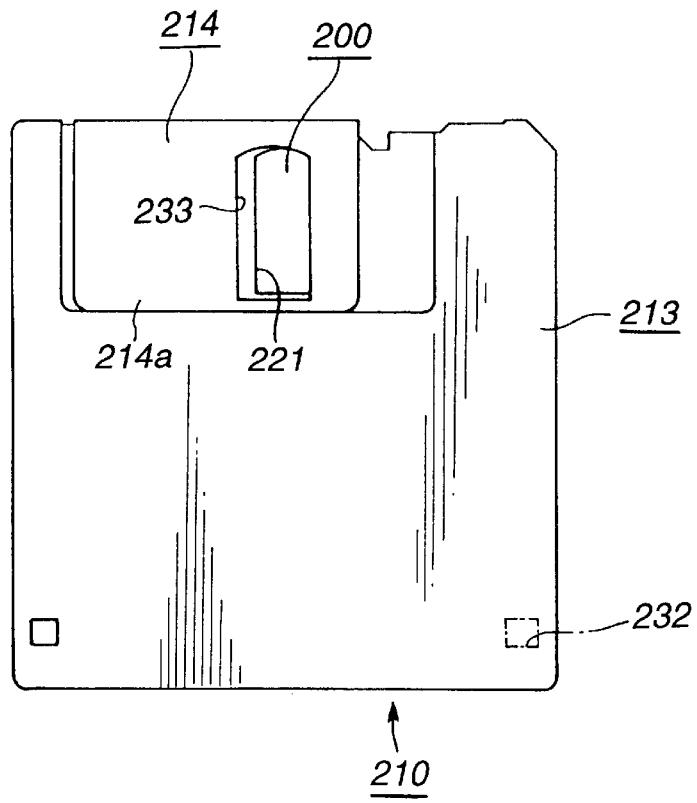
FIG. 7 is a plan view showing a conventional disc cartridge.
Figure 8:
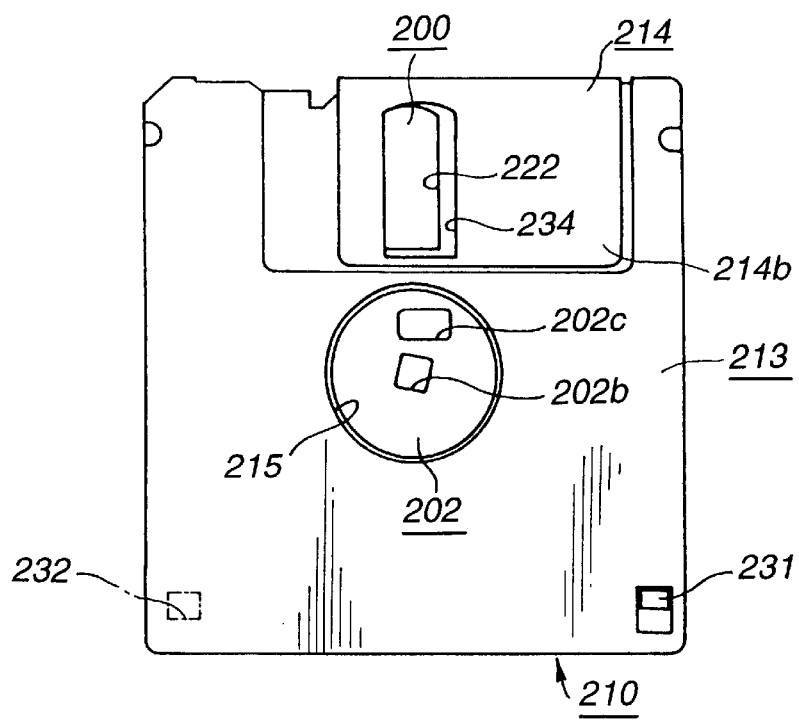
FIG. 8 is a bottom view showing a conventional disc cartridge.

Meanwhile, with the hub 202 mounted on the conventional magnetic disc 200, since the setting surface 202e on the disc supporting surface of the disc table is flush with the outer peripheral surface of the disc supporting surface 222a facing the magnet, the distance H0 between the surface of the hub 202 facing the magnet 224 and the surface of the magnet 224 is substantially equal to the distance between the disc supporting surface 222a and the magnet 224, when the hub is set on the disc table 222, as shown in FIG. 4. Also, the hub 2 mounted on the disc table 101 of the first embodiment, has a setting surface 2j for the hub supporting surface 101a of the disc table 101, and a surface facing the disc table 101 of the outer rim portion 2i is flush with the attraction surface 2k facing the magnet 102 provided on the disc table 101, so that the distance H0 between the attraction surface 2k of the hub 202 facing the magnet 224 and the surface of the magnet 224 is substantially equal to the distance between the setting surface 2i and the magnet surface.

Conversely, with the hub 72 of the second embodiment of the magnetic disc 72 of the present invention, since the attraction surface 72b of the outer rim portion 72g is protruded by the distance L from the hub supporting surface 101a of the inner rim portion 72f, the hub 72 is closer by this distance L to the facing surface 102a than the hub 202 of the magnetic disc 200 or the hub 2 of the magnetic disc 1 of the first embodiment, so that the force of attraction is larger than in the case of the conventional magnetic disc 200 or the magnetic disc 1 of the first embodiment, with the force of holding of the magnetic disc 71 to the disc table 101 thus being larger.

The reason the force of attraction with respect to the disc table 101 needs to be increased for the high recording capacity type magnetic disc 71 is explained.

The magnetic disc 71 of large recording capacity is rotated at an elevated speed for recording and/or reproducing information signals. In the disc drive device 150 employing the magnetic disc 71 of large recording capacity, the magnetic disc 71 needs to be rotated at an elevated speed. In the disc drive device 150, the magnetic disc 71 needs to be positively unified with respect to the disc table 101 even if the magnetic disc 71 is rotated at a high speed. For positively unifying the magnetic disc 71 to the disc table 101 even under high speed rotation of the disc, the hub 72 needs to be attracted and held by the disc table 101 with a larger force of attraction. For raising the force of attraction of the hub 72, it may be contemplated to raise the magnetic force of the magnet 102 provided on the disc table 101. However, if the magnetic force of the magnet 102 is increased, there is a risk that centering cannot be achieved when the conventional magnetic disc 200 is used. That is, there is not produced slip between the magnetic disc 200 and the disc table 101 such that the driving pin 104 cannot be pressed against the driving pin engagement opening 202c while the spindle 103 cannot be pressed against the spindle opening 202b. If the conventional magnetic disc 200 is loaded, and the magnetic force of the magnet 102 is reduced for enabling centering of the magnetic disc 200 with respect to the spindle 103, it becomes difficult to chuck the magnetic disc 71 of large recording capacity rotating at a high speed with respect to the disc table 101.

In the magnetic disc 71 of the second embodiment of the present invention, since the attraction surface 72b of the outer rim portion 72g is protruded downwards by the distance L from the hub supporting surface 101a of the inner rim portion 72f, the attraction surface 72b can be approached to the magnet 102 provided on the disc table 101 a distance corresponding to this amount, so that, with the same magnetic force of the magnet 102, the force of attraction for the magnet 102 can be made higher than that in the case of the conventional magnetic disc 200. That is, since the second embodiment of the magnetic disc 71 of the present invention has the attraction surface 72b closer to the magnet 102 of the disc table 101, it becomes possible to increase the attraction of the conventional magnetic disc 200 with respect to the disc table 101 so that the magnetic disc can be unified to the disc table 101 even under high-speed rotation.

Moreover, with the hub 72 used in the second embodiment of the magnetic disc 71 of the present invention, the surface of the inner rim portion 72f formed with a step on the inner rim of the outer rim portion 72g serves as the setting surface 72a on the disc table 101, so that the setting surface can be reduced in diameter as compared to the setting surface 202e of the hub 202 of the conventional magnetic disc 200 on the disc table 101 thus assuring high degree of planarity. Moreover, since the spindle opening 72c provided at the center of the inner rim portion 72f is circular in profile, there is no risk of the setting surface 72a becoming distorted to render it possible to maintain high planarity.

What is claimed is:

1. A disc-shaped recording medium comprising:
    a disc substrate including a major surface operating as a signal recording portion and a substantially circular center opening in said major surface; and
    a hub composed of magnetic material mounted on said disc substrate for closing said center opening in said disc substrate, wherein
        said hub includes a circular center spindle opening for inserting therein a spindle of a disc drive device and, said spindle opening is a predetermined tolerance with respect to said spindle, and at a predetermined distance from said spindle opening, a driving member inserting opening for inserting therein a driving member of said disc drive device, and said hub further includes an inner rim portion having said spindle opening formed at a center thereof, an outer rim portion, and a connecting portion interconnecting said inner portion and said outer rim portion, wherein said outer rim portion protrudes from said major surface by a distance that is greater than a distance by which said inner rim portion protrudes from said major surface,
        said signal recording portion is divided into a plurality of concentric recording tracks with each of said plurality of concentric recording tracks equiangularly divided into a plurality of servo frames, each of said plurality of servo frames divided into a servo area and a data area, and
        servo frame information is pre-recorded on said servo area for providing at least one of a gain control signal, a servo timing mark, a grey code area and a plurality of burst patterns located on either side of a center of said recording tracks and displaced from each other for providing a tracking servo.

2. The disc-shaped recording medium as set forth in claim 1, wherein information is magnetically recorded on said signal recording portion.

3. A disc cartridge comprising:
    a main cartridge body portion including a first half and a second half with an opening formed in one of said first half and said second half for inserting therein a spindle of a disc drive device; and
    a disc-shaped recording medium rotatably housed in said main cartridge body portion, wherein
        said disc-shaped recording medium includes a disc substrate having a major surface operating as a signal recording portion and a substantially circular center opening in said major surface and a hub composed of a magnetic material mounted on said disc substrate for closing said center opening provided in said disc substrate,
        said hub includes a circular center spindle opening for inserting therein said spindle and, said spindle opening is a predetermined tolerance with respect to said spindle, and at a predetermined distance from said spindle opening, a driving member inserting opening for inserting therein a driving member of said disc drive device, and said hub further includes an inner rim portion having said spindle opening formed at a center thereof, an outer rim portion, and a connecting portion interconnecting said inner portion and said outer rim portion, wherein said outer rim portion protrudes from said major surface by a distance that is greater than a distance by which said inner rim portion protrudes from said major surface,
        said signal recording portion is divided into a plurality of concentric recording tracks with each of said plurality of concentric recording tracks equiangularly divided into a plurality of servo frames, each of said plurality of servo frames divided into a servo area and a data area, and
        servo frame information is pre-recorded on said servo area for providing at least one of a gain control signal, a servo timing mark, a grey code area and a plurality of burst patterns located on either side of a center of said recording tracks and displaced from each other for providing a tracking servo.

4. The disc cartridge as set forth in claim 3, wherein information is magnetically recorded on said signal recording portion.

5. A disc-shaped recording medium comprising:
    a disc substrate including a major surface operating as a signal recording portion and a substantially circular center opening in said major surface; and
    a hub mounted on said disc substrate for closing said center opening in said disc substrate, wherein
        said hub includes an inner rim portion having a spindle opening at a center of said inner rim portion and an outer rim portion connected to an outer side of said inner rim portion via a step difference for extending from said inner rim portion to a side from which a spindle is inserted into said spindle opening,
        said spindle opening is a predetermined tolerance with respect to said spindle.

6. The disc-shaped recording medium as set forth in claim 5, wherein information is magnetically recorded on said signal recording portion.

7. A disc cartridge comprising:
    a main cartridge body portion including a first half and a second half with an opening formed in one of said first half and said second half for inserting therein a spindle of a disc drive device; and
    a disc-shaped recording medium rotatably housed in said main cartridge body portion, wherein
        said disc-shaped recording medium includes a disc substrate having a major surface operating as a signal recording portion and a substantially circular center opening in said major surface and a hub mounted on said disc substrate for closing said center opening in said disc substrate, said hub includes an inner rim portion having a center spindle opening for inserting therein said spindle and an outer rim portion connected to an outer side of said inner rim portion via a step difference for extending from said inner rim portion to a side from which said spindle is inserted into said spindle opening, and said center spindle opening is a predetermined tolerance with respect to said spindle.

8. The disc-shaped recording medium as set forth in claim 7, wherein information is magnetically recorded on said signal recording portion.

\* \* \* \* \*